United States Patent
Lee

(10) Patent No.: US 11,760,688 B2
(45) Date of Patent: Sep. 19, 2023

(54) GLASS ARTICLE AND METHOD OF MANUFACTURING THE SAME

(71) Applicant: Samsung Display Co., LTD., Yongin-si (KR)

(72) Inventor: Hoi Kwan Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 235 days.

(21) Appl. No.: 16/998,062

(22) Filed: Aug. 20, 2020

(65) Prior Publication Data

US 2021/0206692 A1 Jul. 8, 2021

(30) Foreign Application Priority Data

Jan. 3, 2020 (KR) .......................... 10-2020-0000881

(51) Int. Cl.
| | | |
|---|---|---|
| C03C 21/00 | (2006.01) | |
| C03C 27/10 | (2006.01) | |
| C03C 4/18 | (2006.01) | |
| G02F 1/1333 | (2006.01) | |

(52) U.S. Cl.
CPC .............. *C03C 21/003* (2013.01); *C03C 4/18* (2013.01); *C03C 21/002* (2013.01); *C03C 27/10* (2013.01); *G02F 1/133302* (2021.01); *G02F 1/133331* (2021.01)

(58) Field of Classification Search
None
See application file for complete search history.

(56) References Cited

U.S. PATENT DOCUMENTS 9,796,621 B2 10/2017 Varshneya et al.
2002/0098297 A1 7/2002 Jang et al.
(Continued)

FOREIGN PATENT DOCUMENTS

CN 109821418 5/2019
DE 102013110098 A1 * 9/2014 ........... C03C 21/002
(Continued)

OTHER PUBLICATIONS

Translation of DE-102013110098, Alkemper et al. (Year: 2014).*
(Continued)

*Primary Examiner* — David Sample
(74) *Attorney, Agent, or Firm* — CANTOR COLBURN LLP

(57) ABSTRACT

A glass article includes a first surface, a second surface which is opposite the first surface, a first compressive region which extends to a first compression depth in a thickness direction from the first surface, a second compressive region which extends to a second compression depth from the second surface, and a tensile region which is disposed between the first compressive region and the second compressive region. A stress profile of the first compressive region includes a first point and a first inflection point, the first inflection point is located between the first point and the first surface, a depth from the first surface to the first point is 45 to 55% of the first compression depth from the first surface, stress at the first point is greater than 50% of compressive stress of the first surface, and a thickness of the glass article is 0.01 to 0.05 mm.

14 Claims, 30 Drawing Sheets

(56) References Cited

U.S. PATENT DOCUMENTS

| | | | | |
|---|---|---|---|---|
| 2012/0194974 A1* | 8/2012 | Weber | ............... | C03C 21/002 |
| | | | | 361/679.01 |
| 2013/0008789 A1 | 1/2013 | Ronaghi et al. | | |
| 2015/0111040 A1* | 4/2015 | Funatsu | ............... | C03C 23/006 |
| | | | | 65/30.13 |
| 2017/0158556 A1* | 6/2017 | Dejneka | ............... | C03C 21/002 |
| 2017/0305787 A1 | 10/2017 | Gomez et al. | | |
| 2018/0072619 A1* | 3/2018 | Kashima | ............... | C03C 21/002 |
| 2019/0023611 A1* | 1/2019 | Luzzato | ............... | C03C 21/002 |
| 2022/0119306 A1* | 4/2022 | Akiba | ............... | C03C 3/083 |

FOREIGN PATENT DOCUMENTS

| | | | | | |
|---|---|---|---|---|---|
| KR | 1020110036828 A | | 4/2011 | | |
| KR | 1020110038701 A | | 4/2011 | | |
| KR | 101113457 B1 | | 3/2012 | | |
| KR | 101302664 B1 | | 9/2013 | | |
| KR | 20160130914 A | * | 11/2019 | ........... | C03C 21/002 |
| WO | 2018218691 | | 12/2018 | | |
| WO | WO-2018218691 A1 | * | 12/2018 | ........... | C03C 21/002 |
| WO | 2019218155 | | 11/2019 | | |

OTHER PUBLICATIONS

Translation of KR-20160130914, Lee et al. (Year: 2016).*
Essential Laboratory Mathematics, Johnson et al. p. 30. (Year: 2003).*
Partial European Search Report—European Application No. 20217802.6 dated Sep. 23, 2021, citing references listed within.
Extended European Search Report—European Application No. 20217802.6 dated Feb. 4, 2022, citing references listed within.
Satoshi UDA et al., "Transformation of the incongruent-melting state to the congruent-melting state via an external electric field for the growth of langasite", Journal of Crystal Growth, (2005), vol. 281, pp. 481-491.

* cited by examiner

GLASS ARTICLE AND METHOD OF MANUFACTURING THE SAME

This application claims priority to Korean Patent Application No. 10-2020-0000881 filed on Jan. 3, 2020, and all the benefits accruing therefrom under 35 U.S.C. § 119, the content of which in its entirety is herein incorporated by reference.

BACKGROUND

1. Field

The invention relates to a glass article and a method of manufacturing the same.

2. Description of the Related Art

A glass articles is widely used in electronic devices including display devices, building materials, and the like. For example, the glass article is applied to a substrate of a flat panel display device such as a liquid crystal display, an organic light emitting display or an electrophoretic display, or to a cover window for protecting the display device.

Research has been conducted on a display device that can be folded for user convenience. The glass article applied to a foldable display device may have a small thickness to alleviate bending stress when the display device is folded.

However, if the glass article applied to a cover window has a small thickness to alleviate bending stress, crack resistance may be lowered.

SUMMARY

An exemplary embodiment of the invention provides a glass article having good compressive stress while having a small thickness.

Another exemplary embodiment of the invention provides a display device including a glass article having good compressive stress while having a small thickness.

Still another exemplary embodiment of the invention provides a method of manufacturing a glass article having good compressive stress while having a small thickness.

Yet another exemplary embodiment of the invention provides an electric field applying device used in a method of manufacturing a glass article having good compressive stress while having a small thickness.

However, aspects of the disclosure are not restricted to the one set forth herein. The above and other aspects of the disclosure will become more apparent to one of ordinary skill in the art to which the present disclosure pertains by referencing the detailed description of the present disclosure given below.

According to an exemplary embodiment, a glass article a first surface, a second surface which is opposite the first surface, a first compressive region which extends to a first compression depth in a thickness direction of the glass article from the first surface, a second compressive region which extends to a second compression depth in the thickness direction from the second surface, and a tensile region which is disposed between the first compression depth and the second compression depth, where a stress profile of the first compressive region includes a first point and a first inflection point, the first inflection point is located between the first point and the first surface, a depth from the first surface to the first point is about 45 to about 55 percentages (%) of the first compression depth from the first surface, stress at the first point is greater than about 50% of compressive stress at the first surface, and a thickness of the glass article is about 0.01 to about 0.05 millimeters (mm).

In an exemplary embodiment, the stress profile of the first compressive region may be convex upward, when the stress profile is illustrated as a graph of which x axis represents the thickness direction and y axis represents a stress value.

In an exemplary embodiment, the first compression depth may range from about 8 micrometers ($\mu$m) to about 12 $\mu$m, and the compressive stress at the first surface may range from about 800 megapascals (MPa) to about 1100 MPa.

In an exemplary embodiment, stress at the first inflection point may be about 60% or more of the compressive stress at the first surface.

The glass article may further include a first side surface located between the first surface and the second surface, a first chamfer surface located between the first side surface and the first surface, and a second chamfer surface located between the first side surface and the second surface.

In an exemplary embodiment, the stress profile of the first compressive region may be symmetrical to a stress profile of the second compressive region.

The glass article may further include hydrogen ions and hydronium ions.

The glass article may further include impurities, where the content of the impurities is about 0.02 percentages by weight (wt %) or more, and the impurities may comprise copper ions, iron ions, or tin ions.

In an exemplary embodiment, the first compression depth of the first compressive region may be greater than the second compression depth of the second compressive region, and a magnitude of the compressive stress at the first surface may be greater than a magnitude of compressive stress at the second surface.

According to another exemplary embodiment, a glass article includes a first surface, a second surface which is opposite the first surface, a first compressive region which extends to a first compression depth in a thickness direction of the glass article from the first surface, a second compressive region which extends to a second compression depth in the thickness direction from the second surface, and a tensile region which is disposed between the first compressive region and the second compressive region, where a stress profile of the first compressive region includes a first point and a first inflection point, the first inflection point is located between the first point and the first surface, a depth from the first surface to the first point is about 45 to about 55% of the first compression depth from the first surface, stress at the first point is greater than about 50% of compressive stress of the first surface, the first compression depth of the first compressive region is greater than the second compression depth of the second compressive region, and a magnitude of the compressive stress at the first surface is greater than a magnitude of compressive stress at the second surface.

In an exemplary embodiment, the glass article may be formed sequentially through an electric field applying operation, in which a cathode (a negative voltage) is applied to the first surface and an anode (a positive voltage) is applied to the second surface, and a chemical tempering operation.

According to still another exemplary embodiment, a display device includes a display panel which includes a plurality of pixels, a cover window which is disposed on the display panel, and an optically-clear bonding layer which is disposed between the display panel and the cover window, where the cover window includes a first surface, a second surface which is opposite the first surface, a first compressive region which extends to a first compression depth in a thickness direction of the glass article from the first surface, a second compressive region which extends to a second compression depth in the thickness direction from the second surface, and a tensile region which is disposed between the first compressive region and the second compressive region, where a stress profile of the first compressive region includes a first point and a first inflection point, the first inflection point is located between the first point and the first surface, a depth from the first surface to the first point is about 45 to about 55% of the first compression depth from the first surface, stress at the first point is greater than about 50% of compressive stress of the first surface, and a thickness of the cover window is about 0.01 to about 0.05 mm.

In an exemplary embodiment, the stress profile of the first compressive region may be convex upward when the stress profile is illustrated as a graph of which x axis represents the thickness direction and y axis represents a stress value, the first compression depth ranges from about 8 μm to about 12 μm, the compressive stress at the first surface ranges from about 800 MPa to about 1100 MPa, and stress at the first inflection point is about 60% or more of the compressive stress at the first surface.

In an exemplary embodiment, the first compression depth of the first compressive region may be greater than the second compression depth of the second compressive region, and a magnitude of the compressive stress at the first surface is greater than a magnitude of compressive stress at the second surface.

According to yet another exemplary embodiment, a method of manufacturing a glass article, the method includes forming a sheet of glass having a thickness of about 0.01 to about 0.05 mm, concentrating sodium ions on surfaces of the sheet of glass, and chemically tempering the sheet of glass having the sodium ions concentrated on the surfaces of the sheet of glass.

In an exemplary embodiment, the concentrating of the sodium ions on the surfaces of the sheet of glass may include high-temperature/high-humidity treatment performed under a temperature condition of about 80 to about 90 degrees Celsius, a humidity condition of about 80 to about 90%, and a time condition of about 4 hours or less.

In an exemplary embodiment, the concentrating of the sodium ions on the surfaces of the sheet of glass may include heat treatment performed under a temperature condition of about 600 to about 700 degrees Celsius and a time condition of about 4 hours or less. In an exemplary embodiment, the surfaces of the sheet of glass may comprise a first surface and a second surface opposite the first surface, and the concentrating of the sodium ions on the surfaces of the sheet of glass includes an electric field applying operation in which a cathode (a negative voltage) is applied to the first surface and an anode (a positive voltage) is applied to the second surface.

In an exemplary embodiment, in the electric field applying operation, an electric field may be applied to the sheet of glass within a temperature controllable chamber.

In an exemplary embodiment, a temperature inside the chamber in the electric field applying operation may range from about 0 to about 400 degrees Celsius, and a magnitude of the applied electric field in the electric field applying operation may range from about 100 volts per centimeter (V/cm) to about 2000 V/cm.

In an exemplary embodiment, in the electric field applying operation, the electric field may be applied to the sheet of glass in a silicon oil bath.

According to yet still another exemplary embodiment, a method of manufacturing a glass article, the method comprising forming a sheet of glass which includes a first surface and a second surface opposite the first surface, performing an electric field applying operation in which a negative voltage is applied to the first surface and a positive voltage is applied to the second surface, and chemically tempering the sheet of glass.

In an exemplary embodiment, the electric field applying operation may be performed using an electric field applying device, and the electric field applying device may include a negative plate electrode which applies the negative voltage to the first surface and a positive plate electrode which applies the positive voltage to the second surface.

In an exemplary embodiment, an electric field may be applied to the sheet of glass within a temperature controllable chamber in the electric field applying operation, a temperature inside the chamber in the electric field applying operation may range from about 600 to about 700 degrees Celsius, and a magnitude of the applied electric field in the electric field applying operation may range from about 100 V/cm to about 2000 V/cm.

In an exemplary embodiment, heat supply lines may be respectively connected to the negative plate electrode and the positive plate electrode to supply heat.

In an exemplary embodiment, the electric field applying operation may further include placing the sheet of glass between the negative plate electrode and the positive plate electrode, where each of the negative plate electrode, the positive plate electrode and the sheet of glass may be provided in plural, the negative plate electrodes and the positive plate electrodes may be arranged alternately, and, in the placing of the sheet of glass, the sheets of glass may be respectively placed between the negative plate electrodes and the positive plate electrodes arranged alternately.

In an exemplary embodiment, each of the negative plate electrodes and the positive plate electrodes of the electric field applying device may be rotated to extend along a horizontal direction during the placing of the sheets of glass and extend along a vertical direction when the electric field is applied after the placing of the sheets of glass.

In an exemplary embodiment, each of the negative plate electrodes and the positive plate electrodes may be capable to move along the horizontal direction or the vertical direction.

In an exemplary embodiment, the electric field applying operation may further include placing the sheet of glass between the negative plate electrode and the positive electrode plate, where each of the negative plate electrode and the positive plate electrode may be provided in singular and the sheet of glass may be provided in plural, and the sheets of glass may be arranged parallel to each other between the negative plate electrode and the positive plate electrode in the placing of the sheet of glass.

In an exemplary embodiment, each of the negative voltage and the positive voltage may include a direct current ("DC") waveform, an alternating current ("AC") waveform, a pulsed DC waveform, or a periodic AC (radio frequency ("RF")) waveform.

According to another exemplary embodiment, a glass article includes a first surface, a second surface which is opposite the first surface, a first compressive region which extends to a first compression depth in a thickness direction of the glass article from the first surface, a second compressive region which extends to a second compression depth in the thickness direction from the second surface, and a tensile region which is disposed between the first compressive region and the second compressive region, where a stress profile of the first compressive region is asymmetrical to a stress profile of the second compressive region, and a magnitude of compressive stress at the first surface is different from a magnitude of compressive stress at the second surface.

In an exemplary embodiment, the magnitude of the compressive stress at the first surface may be greater than the magnitude of the compressive stress at the second surface.

In an exemplary embodiment, the first compression depth of the first compressive region may be greater than the second compression depth of the second compressive region.

According to still another exemplary embodiment, a display device includes a display panel which includes a plurality of pixels, a cover window which is disposed on the display panel, and an optically-clear bonding layer which is disposed between the display panel and the cover window, where the cover window includes a first surface, a second surface which is opposite the first surface, a first compressive region which extends to a first compression depth in a thickness direction of the glass article from the first surface, a second compressive region which extends to a second compression depth in the thickness direction from the second surface, and a tensile region which is disposed between the first compressive region and the second compressive region, where a stress profile of the first compressive region is asymmetrical to a stress profile of the second compressive region, a magnitude of compressive stress at the first surface is greater than a magnitude of compressive stress at the second surface, the second surface contacts the optically-clear bonding layer, and the first surface is located outside the second surface.

The display device may be foldable, and when operated in a folded state, the display device may be folded such that parts of the second surface face each other and that a tensile force is applied.

In an exemplary embodiment, the first compression depth of the first compressive region may be greater than the second compression depth of the second compressive region.

According to yet another exemplary embodiment, an electric field applying device includes a negative plate electrode, and a positive plate electrode which is opposite the negative plate electrode, where a sheet of glass comprising a first surface and a second surface opposite the first surface is placed between the negative plate electrode and the positive plate electrode, the negative plate electrode is configured to apply a negative voltage to the first surface, and the positive plate electrode is configured to apply a positive voltage to the second surface.

In an exemplary embodiment, a magnitude of an electric field applied to the sheet of glass by the negative plate electrode and the positive plate electrode may range from about 100 V/cm to about 2000 V/cm.

In an exemplary embodiment, the device may further include heat supply lines which are connected to the negative plate electrode and the positive plate electrode, respectively, where the heat supply lines are configured to apply heat to the negative plate electrode and the positive plate electrode, respectively.

In an exemplary embodiment, each of the negative plate electrode, the positive plate electrode, and the sheet of glass may be provided in plural, the negative plate electrodes and the positive plate electrodes may be arranged alternately, and the sheets of glass may be respectively placed between the negative plate electrodes and the positive plate electrodes arranged alternately.

In an exemplary embodiment, each of the negative plate electrodes and the positive plate electrodes may be rotatable.

In an exemplary embodiment, each of the negative plate electrodes and the positive plate electrodes may be capable to move along a horizontal direction or a vertical direction.

In an exemplary embodiment, each of the negative plate electrode and the positive plate electrode may be provided in singular, the sheet of glass may be provided in plural, and the sheets of glass may be arranged parallel to each other between the negative plate electrode and the positive plate electrode.

In an exemplary embodiment, a glass protective layer may be further disposed between the negative plate electrode and the positive plate electrode and may be disposed between adjacent sheets of glass among the sheets of glass.

In an exemplary embodiment, each of the negative voltage and the positive voltage may include a DC waveform, an AC waveform, a pulsed DC waveform, or a periodic AC (RF) waveform.

In an exemplary embodiment, a coating layer may be further disposed on a surface of the negative plate electrode which faces the adjacent positive plate electrode and on a surface of the positive plate electrode which faces the adjacent negative plate electrode.

In an exemplary embodiment, the coating layer may include an electrode material.

In an exemplary embodiment, the coating layer may include an electrode protective layer, and the electrode protective layer may include a dielectric.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
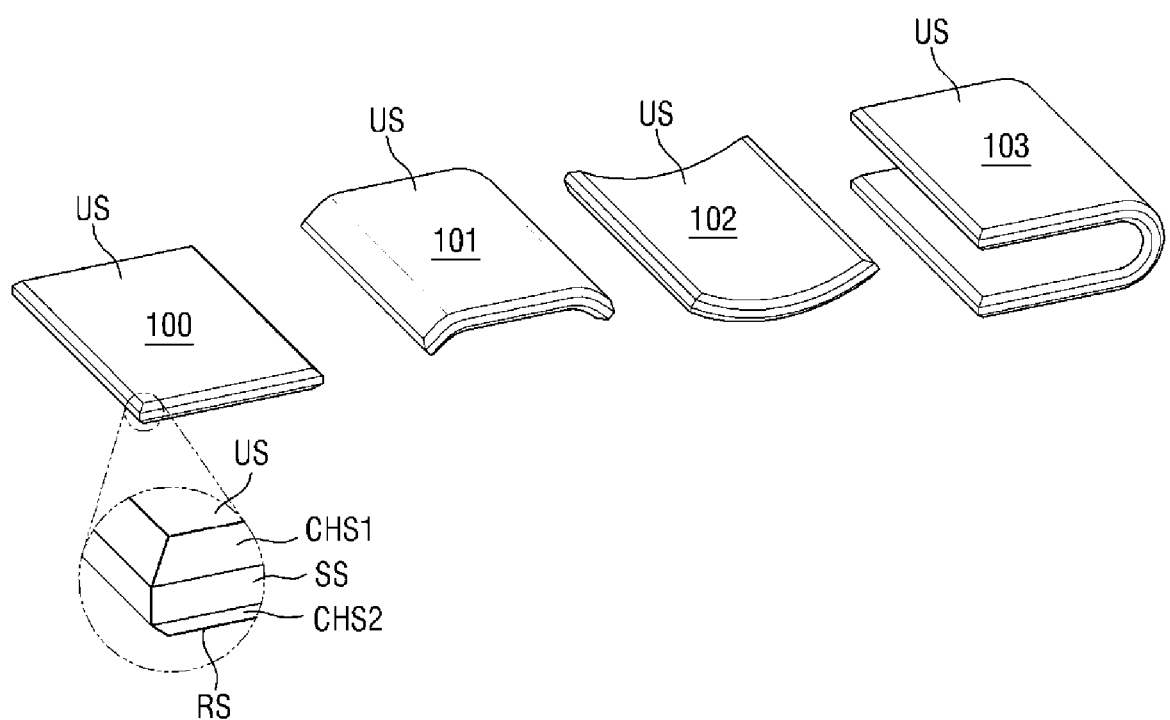
FIG. 1 is a perspective view of glass articles according to various exemplary embodiments.

As used herein, the term "glass article" refers to an article entirely or partially made of glass.

Specific structural and functional descriptions of exemplary embodiments of the invention disclosed herein are only for illustrative purposes of the exemplary embodiments of the invention. The invention may be embodied in many different forms without departing from the spirit and significant characteristics of the invention. Therefore, the exemplary embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular exemplary embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30 percentages (%), 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized exemplary embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described with reference to the attached drawings.

FIG. 1 is a perspective view of glass articles according to various exemplary embodiments.

Glass is used as a cover window for protecting a display, a substrate for a display panel, a substrate for a touch panel, an optical member such as a light guide plate, etc. in electronic devices including displays such as tablet personal computers ("PCs"), notebook PCs, smartphones, electronic books, televisions and PC monitors as well as refrigerators and washing machines including display screens. The glass may also be used for cover glass of vehicle dashboards, cover glass of solar cells, building interior materials, and windows of buildings or houses.

Some glass is required to have strong strength. For example, glass for windows is required to be thin to have high transmittance and light weight but required to be strong enough not to be easily broken by external impact. Glass with increased strength may be produced using a method such as chemical tempering or thermal tempering. Examples of tempered glass having various shapes are illustrated in FIG. 1.

Referring to FIG. 1, in an exemplary embodiment, a glass article 100 may be in the shape of a flat sheet or a flat plate. In exemplary embodiments, glass articles 102 through 103 may have a three-dimensional shape including a bent part. For example, a glass article may include a flat part whose edges are bent (see the glass article 101), may be curved overall (see the glass article 102), or may be folded (see the glass article 103).

Each of the glass articles 100 through 103 may have a rectangular planar shape. However, each of the glass articles 100 through 103 according to the invention is not limited to the rectangular planar shape. In another exemplary embodiment, each of the glass articles 100 through 103 may also have various planar shapes such as a rectangle with rounded corners, a square, a circle, and an ellipse.

In the following exemplary embodiments, a flat plate having a rectangular planar shape will be described as an example of each of the glass articles 100 through 103.

Each of the glass articles 100 through 103 includes a first surface US and a second surface RS opposite the first surface US. The first surface US may be an upper surface of each of the glass articles 100 through 103, and the second surface RS may be a lower surface of each of the glass articles 100 through 103. Each of the glass articles 100 through 103 may further include side surfaces SS and may further include a first chamfer surface CHS1 connecting each side surface SS and the first surface US and a second chamfer surface CHS2 connecting each side surface SS and the second surface RS. A plane in which the first surface US or the second surface RS extend may intersect (for example, may be orthogonal to) a plane in which any one of the side surfaces SS extend. A plane in which any one of the chamfer surfaces CHS1 and CHS2 extend may not be parallel to either the extending plane of the first surface US or the second RS or the extending plane of the any one of the side surfaces SS.

Figure 2:
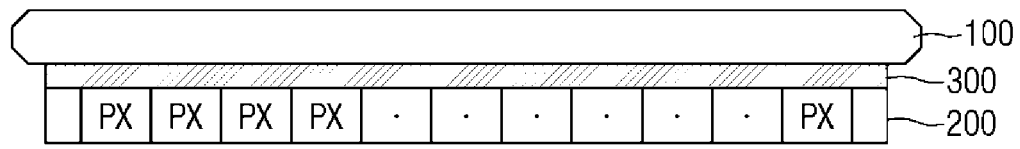
FIG. 2 is a cross-sectional view illustrating an example in which a glass article according to an exemplary embodiment is applied as a cover window of a display device.

FIG. 2 is a cross-sectional view illustrating an example in which a glass article 100 according to an exemplary embodiment is applied as a cover window of a display device 500. Here, the glass article 100 is referred as the cover window 100.

Referring to FIG. 2, the display device 500 may include a display panel 200, the cover window 100 disposed on the display panel 200, and an optically-clear bonding layer 300 disposed between the display panel 200 and the cover window 100 to bond the display panel 200 and the cover window 100 together.

The display panel 200 may be, for example, a self-luminous display panel such as an organic light emitting display panel ("OLED"), an inorganic electroluminescent ("EL") display panel, a quantum dot light emitting display panel ("QED"), a micro-light emitting diode ("LED") display panel, a nano-LED display panel, a plasma display panel ("PDP"), a field emission display panel ("FED") or a cathode ray tube ("CRT") display panel or may be a light receiving display panel such as a liquid crystal display ("LCD") panel or an electrophoretic display ("EPD") panel.

The display panel 200 may include a plurality of pixels PX and may display an image using light emitted from each pixel PX. The display device 500 may further include a touch sensor (not illustrated). In an exemplary embodiment, the touch sensor may be internalized (embedded) in the display panel 200. For example, the touch sensor may be directly disposed on a display member of the display panel 200 so that the display panel 200 itself can perform a touch function. In an exemplary embodiment, the touch sensor may be manufactured separately from the display panel 200 and then attached to an upper surface of the display panel 200 by an optically-clear bonding layer.

The cover window 100 is disposed on the display panel 200. The cover window 100 protects the display panel 200. A reinforced glass article 100 may be applied as a body of the cover window 100. The cover window 100 may be larger in size than the display panel 200. Thus, side surfaces of the cover window 100 may protrude further out than side surfaces of the display panel 200, but exemplary embodiments according to the invention are not limited to this case. The cover window 100 may further include a print layer disposed on at least one surface of the glass article at edges of the glass article. The print layer of the cover window 100 may prevent a bezel region of the display device 500 from being visible from the outside and may perform a decorative function in some cases.

The optically-clear bonding layer 300 is disposed between the display panel 200 and the cover window 100. The optically-clear bonding layer 300 fixes the cover window 100 on the display panel 200. The optically-clear bonding layer 300 may include an optical clear adhesive ("OCA") or an optical clear resin ("OCR").

The tempered glass article 100 described above will now be described in more detail.

Figure 3:
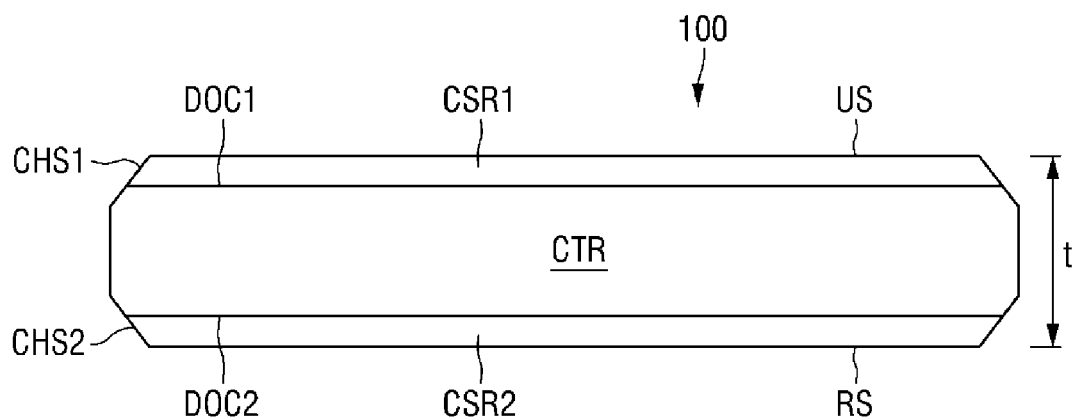
FIG. 3 is a cross-sectional view of a flat plate-shaped glass article according to an exemplary embodiment.

FIG. 3 is a cross-sectional view of a flat plate-shaped glass article 100 according to an exemplary embodiment.

Referring to FIG. 3, the glass article 100 may include a first surface US, a second surface RS, side surfaces SS, and first and second chamfer surfaces CHS1 and CHS2. The first surface US and the second surface RS of the flat plate-shaped glass article 100 are main surfaces having a large area, the first chamfer surface CHS1 connects each side surface SS and the first surface US, and the second chamfer surface CHS2 connects each side surface SS and the second surface RS.

The first surface US and the second surface RS face each other in a thickness direction. When the glass article 100 serves to transmit light like a cover window of a display, the light may usually be incident on any one of the first surface US and the second surface RS and then transmitted to the other surface.

A thickness t of the glass article 100 is defined as a distance between the first surface US and the second surface RS. The thickness t of the glass article 100 may be, but is not limited to, in the range of 0.01 to 2 millimeters (mm). In an exemplary embodiment, the thickness t of the glass article 100 may be about 0.05 mm or less. In an exemplary embodiment, the thickness t of the glass article 100 may be greater than about 0.05 mm and less than 2 mm. In an exemplary embodiment, the thickness t of the glass article 100 may be about 0.01 mm to less than 0.05 mm. The glass article 100 may have a uniform thickness t. However, exemplary embodiments according to the invention are not limited to this case, and the glass article 100 may also have a different thickness tin each region in an exemplary embodiment.

The glass article 100 may be tempered to have a predetermined stress profile therein. The glass article 100 after being tempered better prevents crack generation, crack propagation, and breakage due to external impact than the glass article 100 before being tempered. The glass article 100 tempered through a tempering process may have various stresses in different regions. For example, first and second compressive regions CSR1 and CSR2 in which compressive stress acts may be disposed near the surface of the glass article 100, that is, near the first surface US and the second surface RS. A tensile region CTR in which tensile stress acts may be disposed inside the glass article 100. A stress value may be zero at a boundary between each of the first and second compressive regions CSR1 and CSR2 and the tensile region CTR. The compressive stress in one of the first and second compressive region CSR1 or CSR2 may have a different stress value according to the position (i.e., the depth from the surface). In addition, the tensile region CTR may have a different stress value according to the depth from the surface US or RS.

Positions of the first and second compressive regions CSR1 and CSR2 in the glass article 100, stress profiles in the first and second compressive regions CSR1 and CSR2, and compressive energies of the first and second compressive regions CSR1 and CSR2 or tensile energy of the tensile region CTR greatly affect mechanical properties such as surface strength of the glass article 100. This will be described in detail later.

The first compressive region CSR1 and the second compressive region CSR2 resist external impact to prevent generation of cracks in the glass article 100 or breakage of the glass article 100. Furthermore, the compressive stress of the first and second compressive regions CSR1 and CSR2 may prevent cracks, even if generated, from propagating well at corresponding depths.

A first compression depth DOC1 is a thickness of the first compressive region CSR1, and a second compression depth DOC2 is a thickness of the second compressive region CSR2. The first and second compression depths DOC1 and DOC2 prevent cracks or grooves formed in the first and second surfaces US and RS from propagating to the tensile region CTR inside the glass article 100. The greater the first and second compression depths DOC1 and DOC2, the better the propagation of cracks can be prevented.

As described above, the thickness t of the glass article 100 may be about 0.05 mm or less. When the glass article 100 has a small thickness, the first and second compression depths DOC1 and DOC2 of the first and second compressive regions CSR1 and CSR2 formed may also be small. Each of the first and second compression depths DOC1 and DOC2 according to an exemplary embodiment may be about 0.01 mm or less. In this case, cracks or grooves may easily propagate to the tensile region CTR inside the glass article 100.

However, even if the first and second compression depths DOC1 and DOC2 of the first and second compressive regions CSR1 and CSR2 of the thin glass article 100 are small, since compressive stress at specific depths of the first and second compressive regions CSR1 and CSR2 is increased, the propagation of cracks or grooves to the tensile region CTR can be prevented.

The stress profile of the glass article 100 described above may be formed through tempering involving an ion exchange process.

Figure 4:
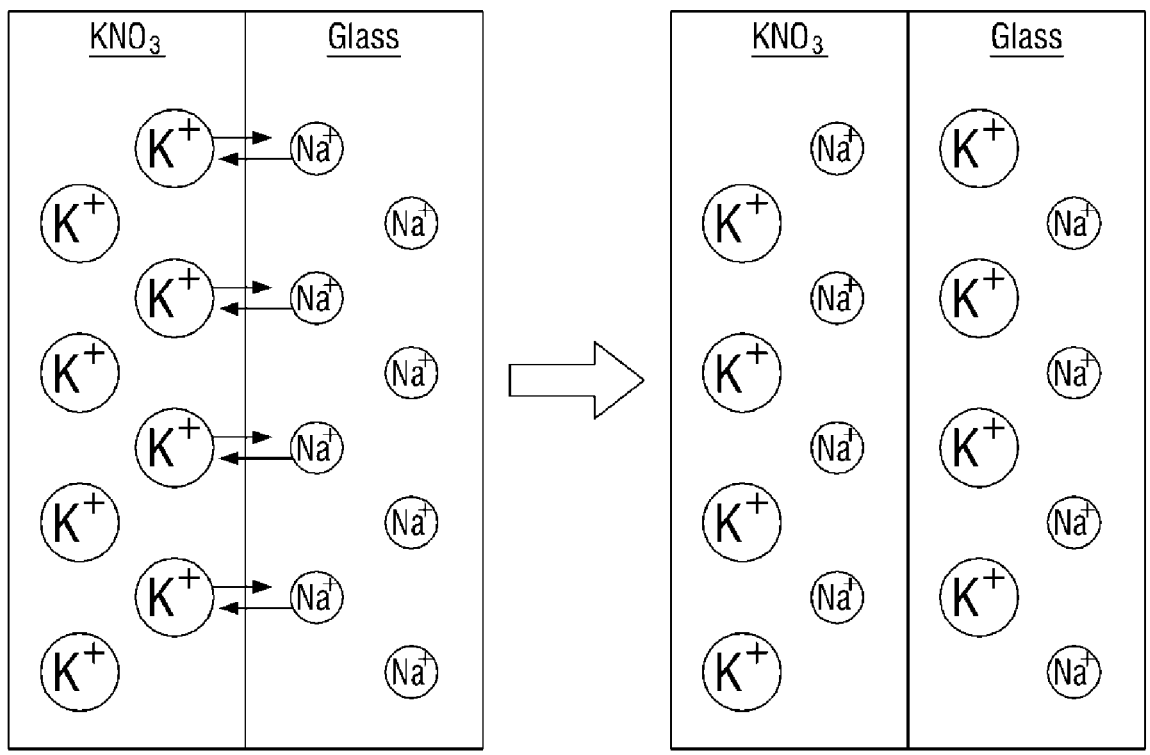
FIG. 4 is a schematic diagram illustrating an ion exchange process according to an exemplary embodiment.

FIG. 4 is a schematic diagram illustrating an ion exchange process according to an exemplary embodiment. In FIG. 4, a case where sodium ions inside glass are exchanged for potassium ions is illustrated. Tempering may be thermal tempering or chemical tempering. In the case of a thin glass article 100 having a thickness of 0.05 mm or less as in the exemplary embodiment of FIG. 3, chemical tempering may be applied for precise stress profile control.

Referring to FIG. 4, chemical tempering may be performed through an ion exchange process. The ion exchange process is a process of exchanging ions inside glass for other ions. The ion exchange process may allow ions located on or near the glass surface to be replaced or exchanged for larger ions having the same valence or oxidation state. For example, when glass includes a monovalent alkali metal such as $Li^+$, $Na^+$, $K^+$, or $Rb^+$, monovalent cations on the surface may be exchanged for $Na^+$, $K^+$, $Rb^+$, or $Cs^+$ having a larger ion radius.

When glass containing sodium ions is exposed to potassium ions by, for example, immersing the glass in a molten salt bath containing potassium nitrate, the sodium ions inside the glass may be discharged to the outside, and the potassium ions may take the place of the sodium ions. The potassium ions replacing the sodium ions generate compressive stress because their ion radius is greater than that of the sodium ions. The greater the amount of potassium ions, the greater the compressive stress. Since ion exchange occurs through the glass surface, the amount of potassium ions may be largest on the glass surface rather than the inside of the glass. Some of the potassium ions may increase the depth of a compressive region (i.e., a compression depth) as they diffuse into the glass. However, the amount of potassium ions may generally decrease as the distance from the surface increases. Therefore, the glass may have a stress profile in which the compressive stress is greatest at the surface and gradually decreases in a direction toward the inside of the glass. However, exemplary embodiments according to the invention are not limited to the above example, and the stress profile may vary depending on the temperature, time, number of times, presence or absence of heat treatment, etc. of the ion exchange process in another exemplary embodiment.

The first and second compressive regions CSR1 and CSR2 of the glass article 100 will be described in detail with reference to FIGS. 5 and 6.

Figure 5:
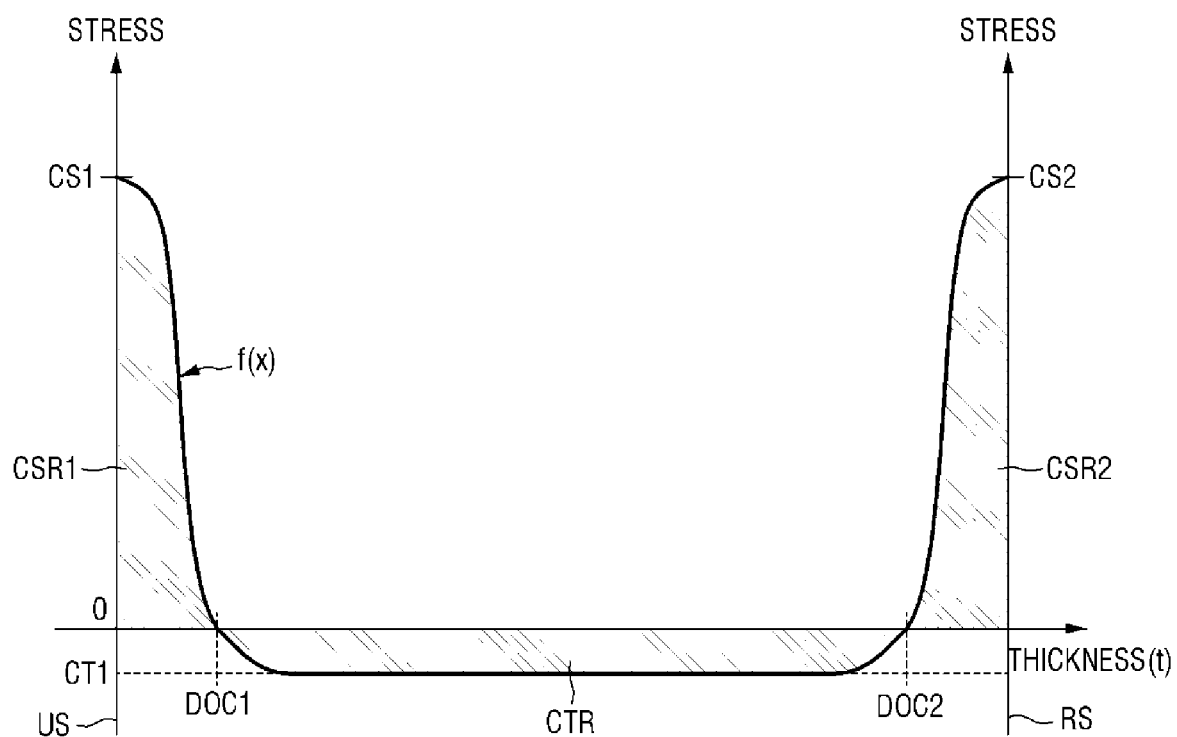
FIG. 5 is a graph illustrating a stress profile of the glass article according to the exemplary embodiment of FIG. 3.

FIG. 5 is a graph illustrating a stress profile of the glass article 100 according to the exemplary embodiment of FIG. 3. FIG. 6 is a graph illustrating the relationship between potassium ions and the profile of compressive stress.

In the graph of FIG. 5, the x axis represents the thickness direction of the glass article 100, and they axis represents a stress value. In FIG. 5, compressive stress is indicated by a positive value, and tensile stress is indicated by a negative value. In the present specification, the magnitude of the compressive/tensile stress denotes the magnitude of an absolute value without regard to the sign of the value.

Figure 6:
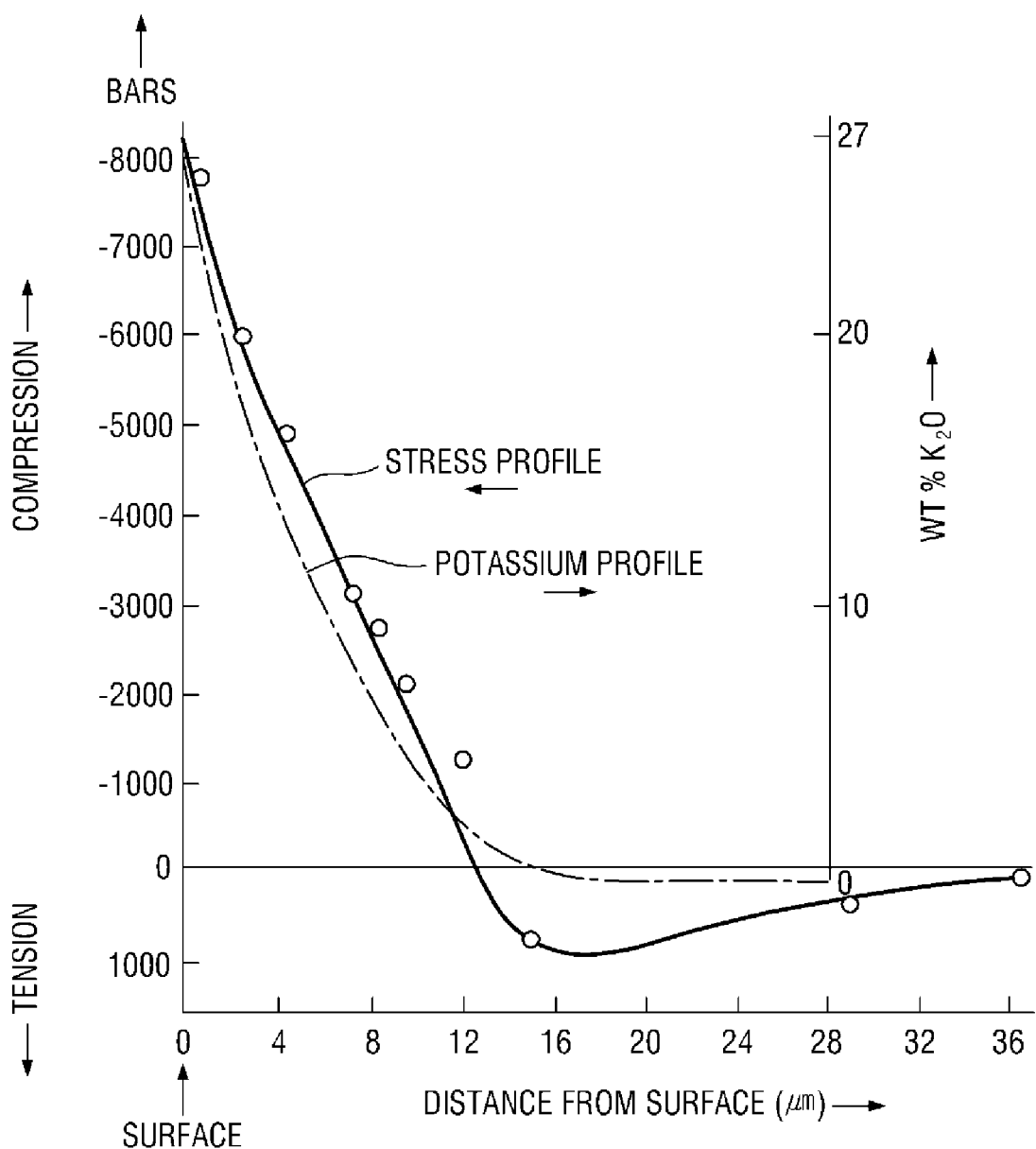
FIG. 6 is a graph illustrating the relationship between potassium ions and the profile of compressive stress.

In the graph of FIG. 6, the x axis represents a distance from surface of the glass article 100, and they axis represents the concentration of potassium ions and the profile of the compressive stress.

Referring to FIGS. 5 and 6, the glass article 100 includes the first compressive region CSR1 extending from the first surface US to the first compression depth DOC1 and the second compressive region CSR2 extending from the second surface RS to the second compression depth DOC2. The tensile region CTR is disposed between the first compression depth DOC1 and the second compression depth DOC2. In the overall stress profile in the glass article 100, regions on both surface sides US and RS may be symmetrical to each other with respect to a center of the thickness (t) direction. Although not illustrated in FIG. 5, compressive regions and a tensile region may also be disposed in a similar manner between facing side surfaces of the glass article 100.

The first compressive region CSR1 and the second compressive region CSR2 resist external impact to prevent generation of cracks in the glass article 100 or breakage of the glass article 100. The greater the first maximum compressive stress CS1 of the first compressive region CSR1 and the second maximum compressive stress CS2 of the second compressive region CSR2, the greater the strength of the glass article 100. Since external impact is usually transmitted through the surfaces of the glass article 100, it is advantageous in terms of durability to have the first and second maximum compressive stresses CS1 and CS2 at the first and second surfaces US and RS of the glass article 100. In this regard, the compressive stresses of the first compressive regions CSR1 and the second compressive region CSR2 tend to be greatest at the surfaces and gradually decrease in a direction toward the inside of the glass article 100. That is, the first maximum compressive stress CS1 is the maximum stress the first surface US can be durable to, and the second maximum compressive stress CS2 is the maximum stress the second surface RS can be durable to.

The first compression depth DOC1 and the second compression depth DOC2 prevent cracks or grooves formed in the first and second surfaces US and RS from propagating to the tensile region CTR inside the glass article 100. The greater the first and second compression depths DOC1 and DOC2, the better the propagation of cracks can be prevented. Points corresponding to the first compression depth DOC1 and the second compression depth DOC2 correspond to boundaries between the first and second compressive regions CSR1 and CSR2 and the tensile region CTR and have a stress value of 0.

Throughout the glass article 100, the tensile stress of the tensile region CTR may be balanced with the compressive stresses of the first and second compressive regions CSR1 and CSR2. That is, the total compressive stress (i.e., compressive energy) in the glass article 100 may be equal to the total tensile stress (i.e., tensile energy). The stress energy accumulated in one region having a predetermined width in the thickness (t) direction in the glass article 100 may be calculated by integrating a stress profile. When the stress profile in the glass article 100 having a thickness oft is represented by a function f(x), the following relation may be established.

$$\int_0^t f(x)dx = 0. \qquad (1)$$

As the magnitude of the tensile stress inside the glass article 100 increases, fragments may be violently expelled when the glass article 100 is broken, and crushing may occur from inside the glass article 100. The maximum tensile stress that meets the fragility criteria of the glass article 100 is not limited to but may satisfy the following relation.

$$CT_1 \leq -\times \ln(t) + 48.2 \qquad (2)$$

In some exemplary embodiments, maximum tensile stress CT1 may be 100 megapascals (Mpa) or less or may be 85 MPa or less. The maximum tensile stress CT1 of 75 MPa or more may improve mechanical properties such as strength. In an exemplary embodiment, the maximum tensile stress CT1 may be 75 to 85 MPa.

The maximum tensile stress CT1 of the glass article 100 may generally be located in a central part of the glass article 100 in the thickness (t) direction. For example, the maximum tensile stress CT1 of the glass article 100 in an absolute value may be located at a depth of 0.4 to 0.6 t, at a depth of 0.45 to 0.55 t, or at a depth of about 0.5 t.

The stress profiles of the first and second compressive regions CSR1 and CSR2 of the glass article 100 may be convex upward. The upward convex stress profiles of the first and second compressive regions CSR1 and CSR2 may be provided by potassium ions for which sodium ions are ion-exchanged in a chemical tempering process.

Referring to FIG. 6, the concentration distribution of potassium ions in the thickness direction from the first and second surfaces US and RS of the glass article 100 is generally similar to the stress profiles of the first and second compressive regions CSR1 and CSR2 of the glass article 100.

That is, sodium ions to be ion-exchanged may be concentrated on the first and second surfaces US and RS of the glass article 100, and the sodium ions concentrated on the first and second surfaces US and RS may be exchanged for potassium ions through chemical tempering. Accordingly, since sodium ions are more concentrated on the first and second surfaces US and RS of the glass article 100 before the chemical tempering, the ion exchange between sodium ions and potassium ions may be further facilitated, and the upward convex stress profiles of the first and second compressive regions CSR1 and CSR2 in which compressive energies of the first and second compressive regions CSR1 and CSR2 increase may be formed.

The stress profile of a compressive region will be described in detail with reference to FIG. 7. The stress profile of the first compressive region CSR1 will be mainly described below. Since the stress profiles of the first compressive region CSR1 and the second compressive region CSR2 are symmetrical to each other, a redundant description of the stress profile of the second compressive region CSR2 will be omitted or given briefly.

Figure 7:
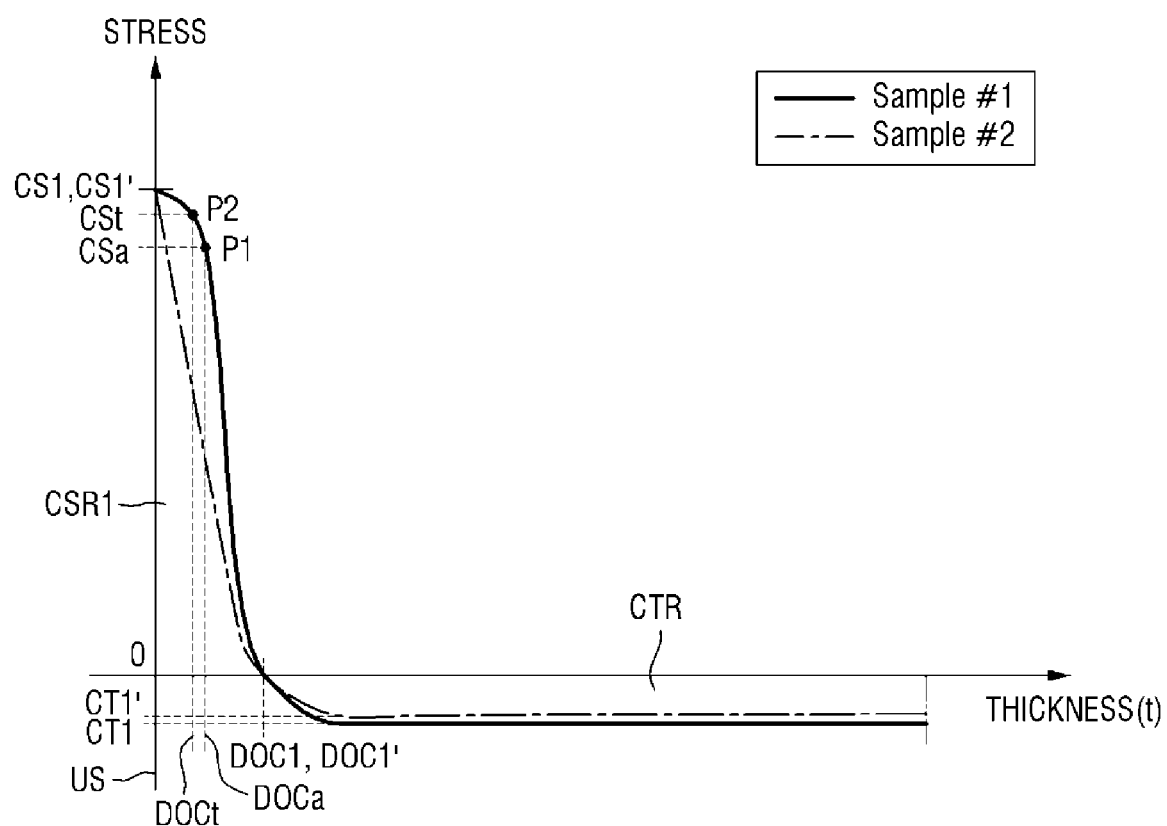
FIG. 7 is an enlarged graph of the vicinity of a first compressive region of FIG. 5.

FIG. 7 is an enlarged graph of the vicinity of the first compressive region CSR1 of FIG. 5.

In FIG. 7, sample #1 represents the glass article 100 according to an exemplary embodiment formed by concentrating sodium ions, which are to be ion-exchanged, on the first and second surfaces US and RS of the glass article 100 and by performing chemical tempering in which the sodium ions concentrated on the first and second surfaces US and RS are exchanged for potassium ions, and sample #2 represents a comparative example having the same glass composition as the glass article 100 according to an exemplary embodiment before sodium ions to be ion-exchanged are concentrated on the first and second surfaces US and RS of the glass article 100 and chemically tempered under the same conditions as the glass article 100 according to the exemplary embodiment.

Referring to FIG. 7, the stress profile of the first compressive region CSR1 of sample #1 may be convex upward as described above. On the other hand, the stress profile of the first compressive region CSR1 of sample #2 may be convex downward or may be substantially straight. A stress reduction near the first surface US in the thickness direction from the first surface US in the stress profile of the first compressive region CSR1 of sample #1 may be smaller than a stress reduction near the first surface US in the thickness direction from the first surface US in the stress profile of the first compressive region CSR1 of sample #2. That is, since sample #1 has a smaller reduction in stress near the surface than sample #2 in the thickness direction from the surface of the glass article 100, sample #1 may have a relatively greater compressive stress.

In FIG. 7, first maximum compressive stress CS1 of sample #1 and first maximum compressive stress CS1' of sample #2 at the first surface US are substantially equal, and first compression depth DOC1 of sample #1 and first compression depth DOC1' of sample #2 are substantially equal. However, exemplary embodiments according to the invention are not limited to this case.

The maximum tensile stress CT1 of the tensile region CTR of sample #1 may be greater than maximum tensile stress CT1' of the tensile region CTR of sample #2.

The stress profile of the first compressive region CSR1 of sample #1 will now be described in more detail. The stress profile of the first compressive region CSR1 of sample #1 may include a first point P1 and a first inflection point P2. The first inflection point P2 may be located between the first point P1 and the first surface US. A depth DOCa at the first point P1 may be between the first surface US and the first compression depth DOC1, and stress CSa at the first point P1 may be between a stress value of 0 MPa and the first maximum compressive stress CS1 at the first surface US. A depth DOCt at the first inflection point P2 may be between the first surface US and the depth DOCa at the first point P1, and stress CSt at the first inflection point P2 may be between the first maximum compressive stress CS1 at the first surface US and the stress CSa at the first point P1.

The depth DOCa at the first point P1 may be 45 to 55% of the first compression depth DOC1 from the first surface US. In an exemplary embodiment, the stress CSa at the first point P1 may be greater than 50% of the first maximum compressive stress CS1 at the first surface US. For example, the stress CSa at the first point P1 may have a value of about 60% or more of the first maximum compressive stress CS1 at the first surface US. In an exemplary embodiment, the stress CSt at the first inflection point P2 may be 60% or more of the first maximum compressive stress CS1 of the first surface US.

For example, the first compression depth DOC1 may be in the range of 8 to 12 micrometers ($\mu m$).

For example, the first maximum compressive stress CS1 at the first surface US may be in the range of 800 to 1100 MPa.

At the depth DOCa of the first point P1 ranging from 4 $\mu m$ to 6 $\mu m$ which is within the range of the first compression depth DOC1, the glass article 100 may have a stress CSa of 400 MPa to 550 Mpa which is greater than 50% of the first maximum compressive stress CS1.

When the stress CSa of the glass article 100 exceeds 400 MPa at the depth DOCa of the first point P1 ranging from 4 $\mu m$ to 6 $\mu m$ which is within the range of the first compression depth DOC1, the propagation of cracks or grooves to the tensile region CTR can be prevented.

Furthermore, when the stress CSa of the glass article 100 is 550 MPa or less at the depth DOCa of the first point P1 ranging from 4 $\mu m$ to 6 $\mu m$ which is within the range of the first compression depth DOC1, the tensile region CTR increased according to the increased compressive regions CSR1 and CSR2 can prevent cracks or grooves from propagating to the tensile region CTR and thus breaking and greatly fragmenting the glass article 100.

A method of manufacturing a glass article will now be described. In the following exemplary embodiments, elements identical to those of the above-described exemplary embodiment will be indicated by like reference characters, and a description thereof will be omitted or given briefly.

Figure 8:
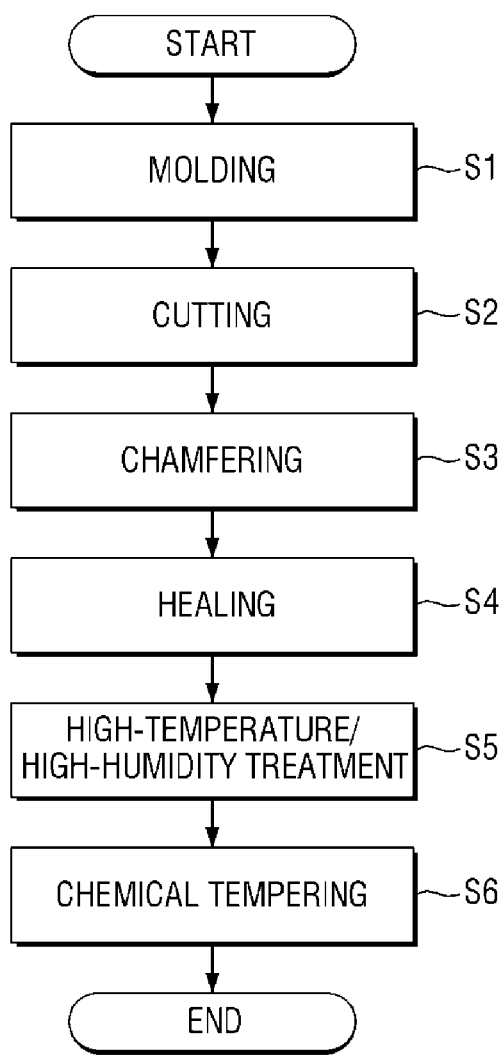
FIG. 8 is a flowchart illustrating operations in a method of manufacturing a glass article according to an exemplary embodiment.
Figure 9:
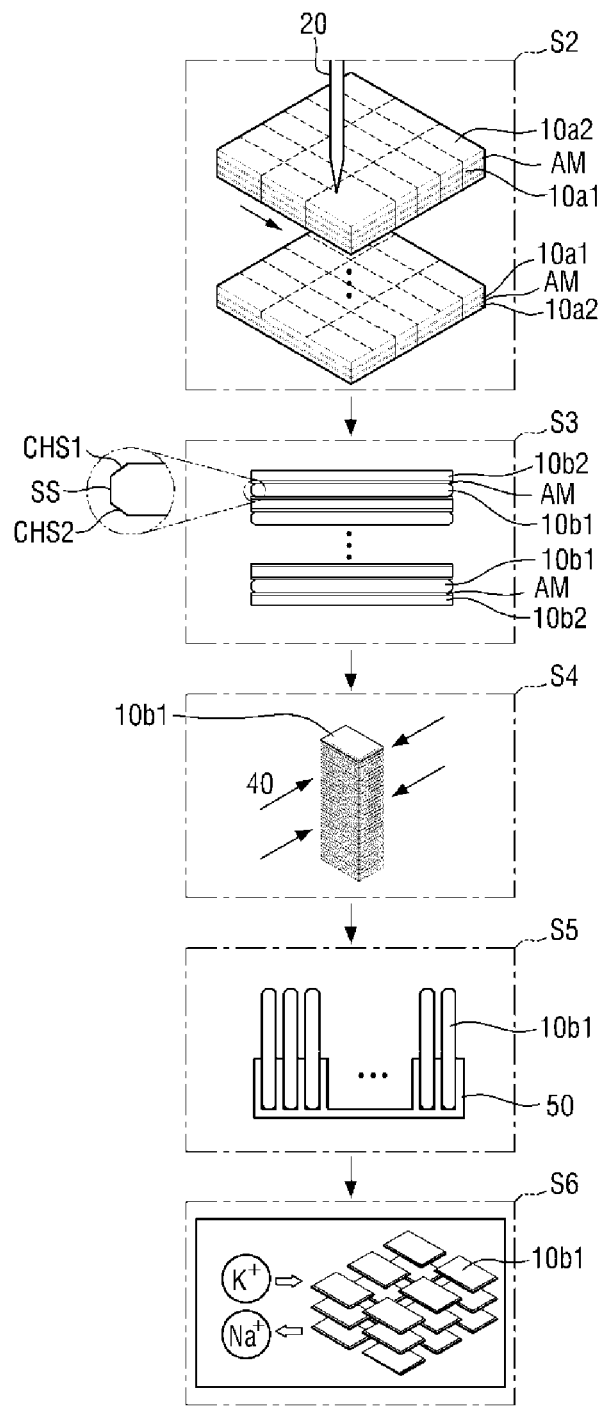
FIG. 9 is a schematic diagram illustrating a series of operations from a cutting operation to a tempering operation of FIG. 8.
Figure 10:
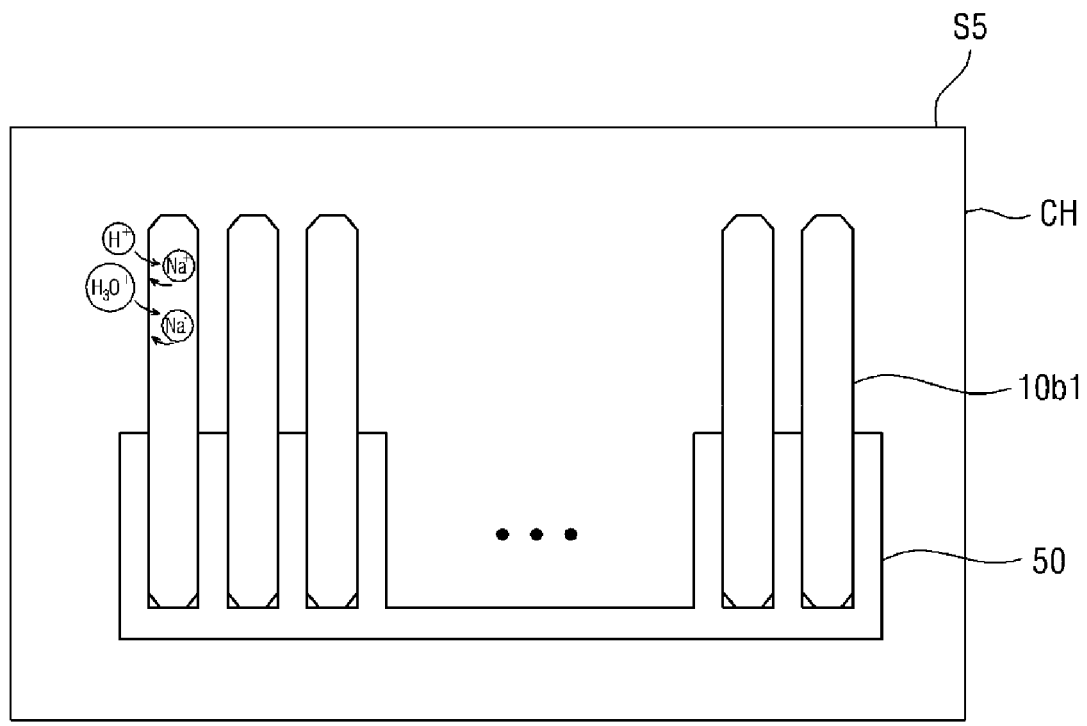
FIG. 10 illustrates a high-temperature/high-humidity treatment operation of FIG. 9 in detail.
Figure 11:
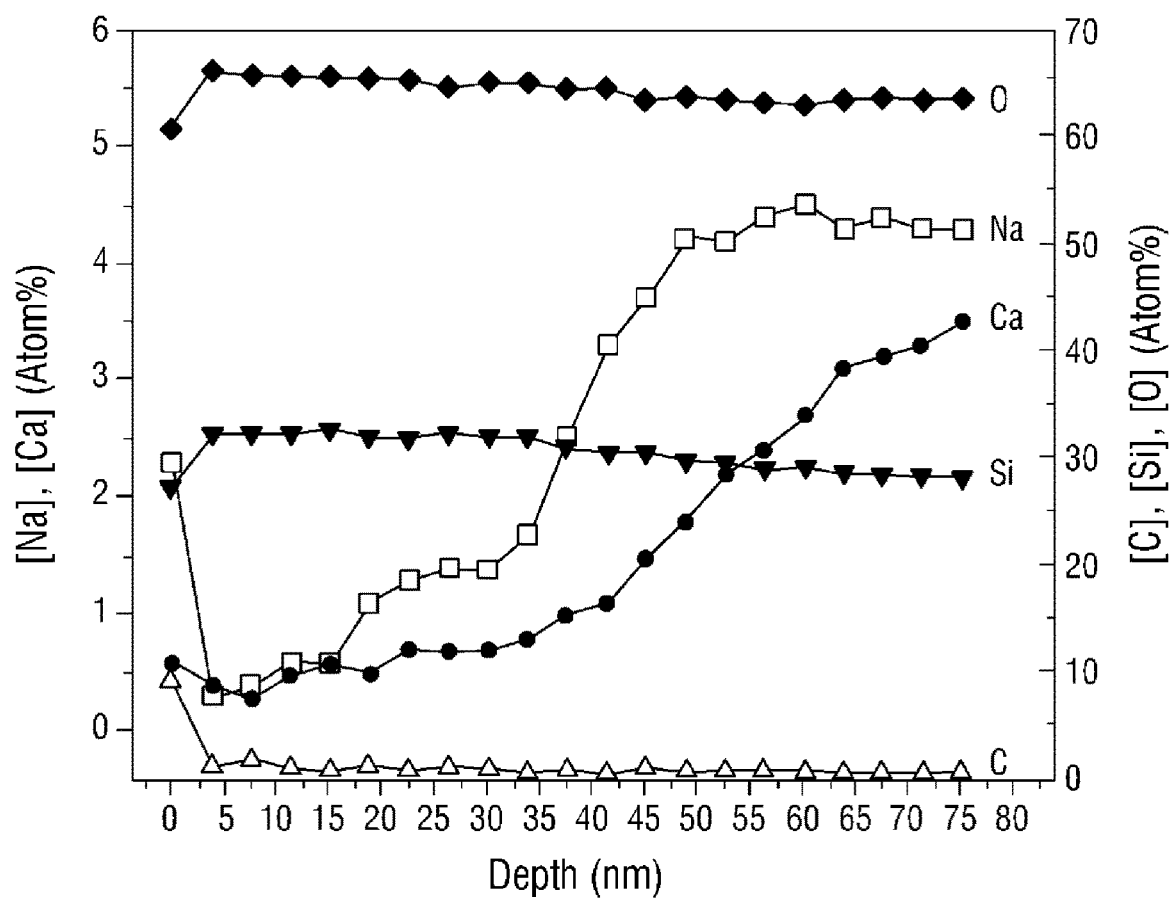
FIG. 11 is a graph illustrating the concentration of ions around a surface of a glass article before the high-temperature/high-humidity treatment operation.
Figure 12:
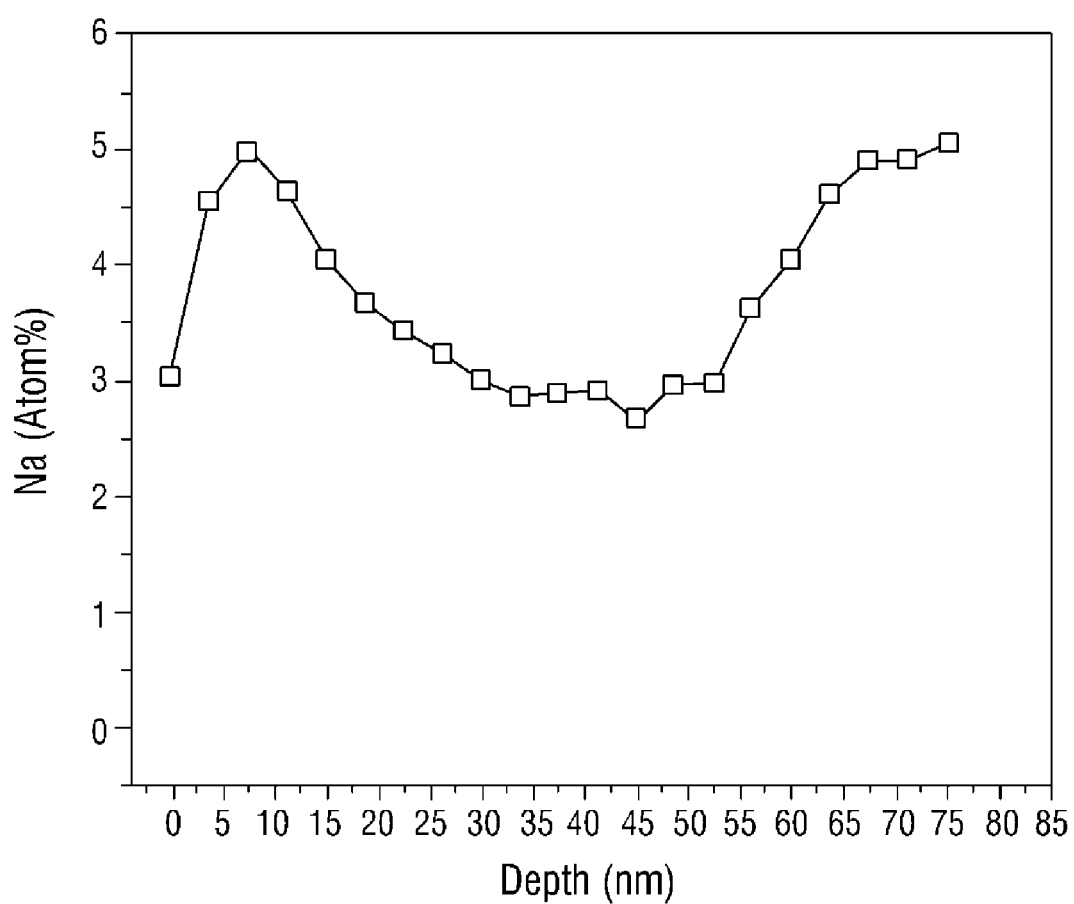
FIG. 12 is a graph illustrating the concentration of ions around the surface of the glass article after the high-temperature/high-humidity treatment operation.

FIG. 8 is a flowchart illustrating operations in a method of manufacturing a glass article according to an exemplary embodiment. FIG. 9 is a schematic diagram illustrating a series of operations from a cutting operation to a tempering operation of FIG. 8. FIG. 10 illustrates a high-temperature/high-humidity treatment operation of FIG. 9 in detail. FIG. 11 is a graph illustrating the concentration of ions around a surface of a glass article before the high-temperature/high-humidity treatment operation. FIG. 12 is a graph illustrating the concentration of ions around the surface of the glass article after the high-temperature/high-humidity treatment operation.

Referring to FIGS. 8 through 10, the method of manufacturing a glass article according to the exemplary embodiment includes a molding operation (operation S1), a cutting operation (operation S2), a chamfering operation (operation S3), a healing operation (operation S4), a high-temperature/high-humidity treatment operation (operation S5), and a chemical tempering operation (operation S6).

The molding operation (operation S1) may include preparing a glass composition and molding the glass composition.

The glass composition may include various compositions. In an exemplary embodiment, the glass composition may include Lithium-Alumina-Silicon ("LAS") glass ceramics containing lithium aluminosilicate. For example, the glass composition may contain 50 to 80 molar percentages (mol %) $SiO_2$, 1 to 30 mol % $Al_2O_3$, 0 to 5 mol % $B_2O_3$, 0 to 4 mol % $P_2O_5$, 3 to 20 mol % $Li_2O$, 0 to 20 mol % $Na_2O$, 0 to 10 mol % $K_2O$, 3 to 20 mol % MgO, 0 to 20 mol % CaO, 0 to 20 mol % SrO, 0 to 15 mol % BaO, 0 to 10 mol % ZnO, 0 to 1 mol % $TiO_2$, and 0 to 8 mol % $ZrO_2$. Here, "0 mol %" means that a corresponding component is not substantially contained. When a composition does not "substantially contain" a specific component, it means that the specific component is not intentionally contained in a raw material and includes a case where a trace, e.g., 0.1 mol % or less of impurities are inevitably contained.

Each component of the glass composition will now be described in more detail. $SiO_2$ may serve to form the framework of glass, increase chemical durability, and reduce generation of cracks due to scratches (i.e., indentations) on the glass surface. To fully perform the above roles, $SiO_2$ may be contained in an amount of 50 mol % or more. To exhibit sufficient meltability, $SiO_2$ may be contained in the glass composition in an amount of 80 mol % or less. $Al_2O_3$ serves to improve crushability of glass. That is, $Al_2O_3$ may cause the glass to be fragmented into a smaller number of pieces when the glass is broken. In addition, $Al_2O_3$ may act as an active component that improves ion exchange performance during chemical tempering and increases surface compressive stress after the tempering. When contained in an amount of 1 mol % or more, $Al_2O_3$ may effectively perform the above functions. To maintain acid resistance and meltability of the glass, the content of $Al_2O_3$ may be 30 mol % or less.

$B_2O_3$ improves chipping resistance and meltability of glass. $B_2O_3$ can be omitted (i.e., 0 mol %) but may further improve the meltability of the glass when contained in an amount of 0.5 mol % or more. 5 mol % or less of $B_2O_3$ may be advantageous in suppressing the generation of striae during melting.

$P_2O_5$ improves ion exchange performance and chipping resistance. $P_2O_5$ can be omitted (i.e., 0 mol %) but may significantly perform the above functions when contained in an amount of 0.5 mol % or more. 4 mol % or less of $P_2O_5$ helps to prevent a significant reduction in crushability and acid resistance.

$Li_2O$ serves to form surface compressive stress through ion exchange. Li ions disposed near the glass surface can be exchanged for Ka ions through an ion exchange process. However, the amount of Li ions exchanged for Ka ions may be significantly smaller than the amount of Na ions exchanged for Ka ions. $Li_2O_3$ may further serve to improve crushability of glass $Na_2O$ serves to form surface compressive stress through ion exchange and improve meltability of glass. Na ions disposed near the glass surface can be exchanged for K ions through an ion exchange process. The content of Na ions may range from 10 percentages by weight (wt %) to 15 wt %. In the molding operation (operation S1), Na ions may be dispersed throughout the entire glass.

$K_2O$ improves ion exchange performance and is related to crushability. $K_2O$ can be omitted but may be contained in an amount of 0.5 mol % or more to improve the ion exchange performance. $K_2O$ content for preventing an excessive reduction in crushability may be 10 mol % or less.

MgO serves to increase surface compressive stress and improve crushability of chemically tempered glass. These roles can be effectively performed when the content of MgO is 3 mol % or more. MgO content of 20 mol % or less is advantageous in reducing the probability of devitrification during glass melting.

CaO serves to improve meltability and crushability of glass. CaO can be omitted but may be contained in an amount of 0.5 mol % or more to effectively perform the above roles. Since too high CaO content can degrade ion exchange performance, the adequate content of CaO may be 20 mol % or less.

SrO, like CaO, serves to improve meltability and crushability of glass. SrO can be omitted but may be contained in an amount of 0.5 mol % or more to effectively perform the above roles. Since too high SrO content can degrade ion exchange performance, the adequate content of SrO may be 20 mol % or less.

BaO serves to improve meltability and crushability of glass. BaO can be omitted but may be contained in an amount of 0.5 mol % or more to effectively perform the above roles. BaO content of 15 mol % or less may be advantageous in preventing excessive degradation of ion exchange performance.

ZnO serves to improve meltability of glass. ZnO can be omitted but may exhibit a significant meltability improvement effect when contained in an amount of 0.25 mol % or more. To prevent a reduction in weather resistance, the content of ZnO may be maintained at 10 mol % or less.

$TiO_2$ improves crushability of chemically tempered glass. $TiO_2$ can be omitted but may exhibit a significant crushability improvement effect when contained in an amount of 0.1 mol % or more. To prevent devitrification during melting, $TiO_2$ may be contained in an amount of 1 mol % or less.

$ZrO_2$ may increase surface compressive stress due to ion exchange and improve crushability of glass. $ZrO_2$ can be omitted but may significantly perform the above roles when contained in an amount of 0.5 mol % or more. 8 mol % or less of $ZrO_2$ helps to suppress devitrification during melting.

The glass composition may, if necessary, include components such as $Y_2O_3$, $La_2O_3$, $Nb_2O_5$, $Ta_2O_5$, and $Gd_2O_3$, in addition to the components listed above. The composition of the glass article 100 may be changed through a molding process or an ion exchange process to be described later.

The glass composition may be molded into the shape of plate glass using various methods. For example, the glass composition may be molded by a float process, a fusion draw process, or a slot draw process.

The glass molded into a flat plate shape may be cut through the cutting operation (operation S2). The glass molded into the flat plate shape may have a size different from the size applied to a final glass article 100. For example, the glass in the state of a large-area substrate as a mother substrate 10*a*1 including a plurality of glass articles may be molded and then cut into a plurality of glass cells 10*b*1 to produce a plurality of glass articles. For example, although the final glass article 100 has a size of about 6 inches, the glass as the mother substrate 10*a*1 may be molded to a size (e.g., 120 inches) several to hundreds of times the size of the final glass article 100 and then cut to produce 20 flat plate shapes at once. This can improve process efficiency as compared with when individual glass articles are molded separately. In addition, even when glass corresponding to the size of one glass article is molded, if the final glass article has various planar shapes, a desired shape may be formed through the cutting process.

The cutting of the glass 10*a*1 may be performed using a cutting knife 20, a cutting wheel, a laser, or the like.

The cutting of the glass (operation S2) may be performed before the tempering of the glass (operation S6). The glass 10*a*1 corresponding to the mother substrate (hereinafter the mother substrate 10*a*1 is referred as the glass 10*a*1) can be tempered and then cut into cells of the final glass article size.

In this case, however, since cut surfaces (e.g., side surfaces) of the glass may not be tempered, it is desirable to perform the tempering operation (operation S6) after completing the cutting operation (operation S2).

In an exemplary embodiment, a plurality of mother substrates 10a1 may be cut together in a state where they are stacked in the thickness direction. An adhesive layer (or a bonding layer) AM may be interposed between the mother substrates 10a1 adjacent to each other in the thickness direction to bond the adjacent mother substrates 10al. Dummy substrates 10a2 may be respectively disposed at the top and bottom of a stacked structure of the mother substrates 10a1 as illustrated in FIG. 9. The mother substrates 10a1 adjacent to the dummy substrates 10a2 located at the top and the bottom may also be bonded to the dummy substrates 10a2 by adhesive layers (or bonding layers) AM, respectively. That is, the mother substrates 10a1 and the dummy substrates 10a2 are alternatively stacked.

Since a plurality of mother substrates 10a1 is cut together in the state where they are stacked, the efficiency of the cutting process may be increased. Furthermore, the dummy substrates 10a2 respectively disposed at the top and bottom of the stacked structure of the mother substrates 10a1 may prevent surfaces (e.g., upper and lower surfaces) of the glass cells 10b1 from being unintentionally treated with a fluorine solution in the healing operation (operation S4) to be described later. That is, the dummy substrates 10a2 respectively disposed at the top and bottom of the stacked structure of the mother substrates 10a1 may serve as barriers in a subsequent process of the mother substrates 10al.

Next, the glass cells 10b1 into which each mother substrate 10a1 has been cut are chamfered (operation S3). More specifically, chamfer surfaces CHS1 and CHS2 of each glass cell 10b1 are formed in a stacked structure state in which the glass cells 10b1 and dummy substrate cells 10b2 are bonded to each other with an adhesive layer (or bonding layer) AM interposed between them. The chamfering (operation S3) of the glass cells 10b1 may be achieved through computerized numerical control ("CNC"). Since the shape of each of the chamfer surfaces CHS1 and CHS2 of each chamfered glass cell 10b1 has been described above, a detailed or redundant description thereof will be omitted. The chamfering of each glass cell 10b1 may prevent edges of the glass cell 10b1 from being chipped due to breakage or impact.

Next, the chamfered glass cells 10b1 are healed (or surface-treated) (operation S4). More specifically, the chamfered glass cells 10b1 are healed (operation S4) to improve reduced strength of side parts of the glass cells 10b1 in the stacked structure state in which the glass cells 10b1 and the dummy substrate cells 10b2 are bonded to each other with the adhesive layer (or bonding layer) AM interposed between them. The chamfered glass cells 10b1 stacked in the thickness direction may be healed together (operation S4).

The healing (operation S4) of the chamfered glass cells 10b1 may be achieved through a healing solution 40. The healing solution 40 may be a solution containing fluorine ions.

In the healing (operation S4) of the glass cells 10b1, the dummy substrate cells 10b2 further disposed at the top and bottom of the stacked structure of the glass cells 10b1 may prevent the surfaces (e.g., the upper and lower surfaces) of the glass cells 10b1 from being unintentionally treated with a fluorine solution.

In some exemplary embodiments, polishing the glass cells 10b1 may be further performed between the chamfering of the glass cells 10b1 (operation S3) and the healing of the glass cells 10b1 (operation S4).

Next, sodium ions are concentrated on the surfaces of the glass cells 10b1. In an exemplary embodiment, the concentrating of the sodium ions on the surfaces of the glass cells 10b1 includes the high-temperature/high-humidity treatment operation (operation S5). After the healing of the glass cells 10b1 (operation S4), the glass cells 10b1 stacked in the thickness direction may be separated and then treated with high temperature/high humidity (operation S5). The high-temperature/high-humidity treatment of the glass cells 10b1 (operation S5) may be performed for about 2 to 4 hours by placing the separated glass cells 10b1 in grooves of a support device 50 inside a chamber CH and adjusting the inside of the chamber CH to a temperature condition of about 80 to about 90 degrees Celsius and a humidity condition of about 80 to about 90%.

Under the above temperature and humidity conditions, hydrogen ions (H+) or hydronium (H3O+) in moisture inside the chamber CH are adsorbed onto the first and second surfaces US and RS of the glass cells 10b1. The adsorbed hydrogen ions (H+) or hydronium (H3O+) tend to replace ions that are easy to be replaced, and sodium ions that are easy to be replaced may migrate to the first and second surfaces US and RS of the glass cells 10b1. Some of the sodium ions that have migrated to the first and second surfaces US and RS of the glass cells 10b1 may be replaced by the adsorbed hydrogen ions (H+) or hydronium (H3O+), and the other sodium ions that have migrated to the first and second surfaces US and RS of the glass cells 10b1 may remain on the first and second surfaces US and RS of the glass cells 10b1 without being replaced by the adsorbed hydrogen ions (H+) or hydronium (H3O+).

That is, the high-temperature/high-humidity treatment of the glass cells 10b1 may result in the formation of sodium ion excess regions in the vicinity of the first and second surfaces US and RS of each glass cell 10b1.

In FIGS. 11 and 12, the x axis represents the thickness direction from the first and second glass surface US or RS, and the y axis represents the content (atom %) of each ion (sodium, calcium, carbon, silicon, oxygen).

Referring to FIGS. 11 and 12, it can be seen that the high-temperature/high-humidity treatment of the glass cells 10b1 (operation S5) increases the distribution of sodium ions in the vicinity of the surfaces of the glass cells 10b1.

Next, the glass cells 10b1 are tempered (operation S6). An ion exchange process may be performed one or more times. For example, the ion exchange process may be performed as a primary ion exchange process. The primary ion exchange process may be performed in a bath. The primary ion exchange process may be performed on a plurality of glass cells 10b1 at the same time. That is, a plurality of glass cells 10b1 may be immersed in one bath so that ion exchange can occur in the glass cells 10b1 at the same time.

The primary ion exchange process is a process of providing the first and second compression depths DOC1 and DOC2 to each glass cell 10b1. The glass cells 10b1 are exposed to a single molten salt containing potassium ions or a mixed molten salt containing potassium ions and sodium ions. For example, for the primary ion exchange process, the glass cells 10b1 are immersed in the bath that contains a single molten salt containing potassium nitrate or a mixed molten salt in which potassium nitrate and sodium nitrate are mixed. When the mixed molten salt is used, the content of potassium nitrate in the bath may be far greater than the content of sodium nitrate. For example, a salt ratio of potassium nitrate and sodium nitrate may be adjusted within the range of 95:5 to 99:1. In an exemplary embodiment, the salt ratio of potassium nitrate and sodium nitrate in the mixed molten salt of the primary ion exchange process may be 99:1.

The primary ion exchange process may be performed at a temperature of, for example, about 420 degrees Celsius or higher.

The primary ion exchange process causes sodium ions inside each glass cell 10b1 to be exchanged for potassium ions larger than the sodium ions, thereby increasing the concentration of the potassium ions in the glass cell.

Furthermore, the sodium ion excess regions formed in the vicinity of the first and second surfaces US and RS of each glass cell 101b1 by the high-temperature/high-humidity treatment of the glass cells 10b1 (operation S5) may further facilitate the ion exchange between potassium ions and sodium ions at the first and second surfaces US and RS of each glass cell 10b1 and may cause the stress profile graphs of sample #1 and sample #2 to be formed as described in FIG. 7.

Glass articles according to exemplary embodiments will now be described.

Figure 13:
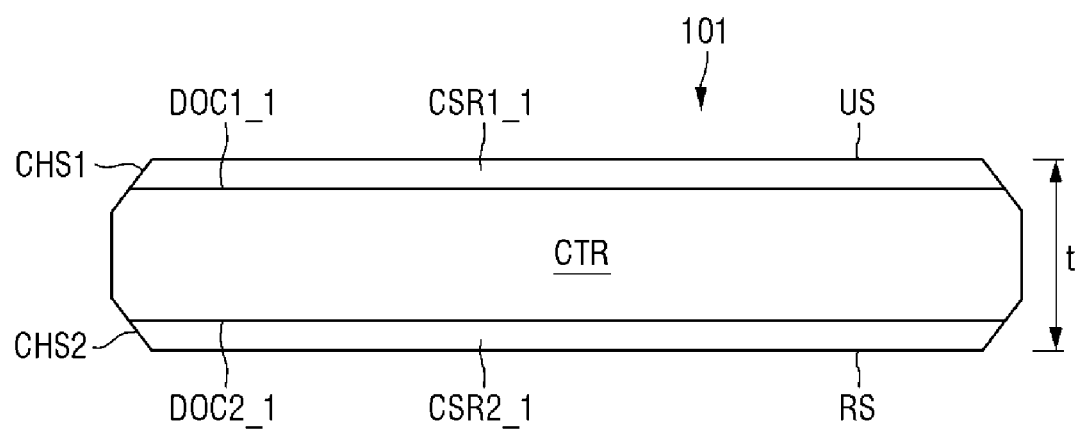
FIG. 13 is a cross-sectional view of a flat plate-shaped glass article according to an exemplary embodiment.
Figure 14:
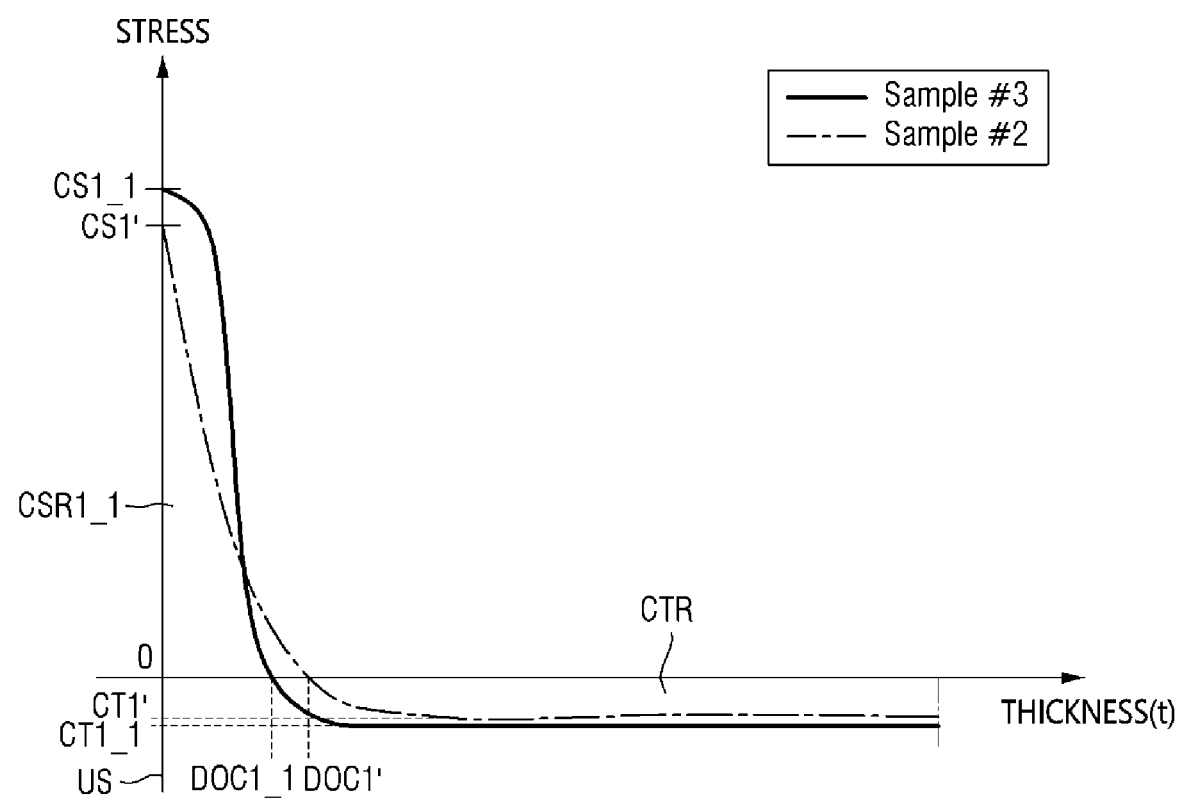
FIG. 14 is a graph illustrating a stress profile of the glass article according to the exemplary embodiment of FIG. 13.

FIG. 13 is a cross-sectional view of a flat plate-shaped glass article 101 according to an exemplary embodiment. FIG. 14 is a graph illustrating a stress profile of the glass article 101 according to the exemplary embodiment.

Referring to FIGS. 13 and 14, the glass article 101 according to the current exemplary embodiment is different from the glass article 100 of FIGS. 3 and 7 in that compressive stresses at first and second compressive regions CSR1_1 and CSR2_1 of the glass article 101 according to the current exemplary embodiment are greater than the first and second maximum compressive stresses CS1 and CS2 at the first and second surfaces US and RS of the glass article 100 of FIGS. 3 and 7 and the first and second compression depths DOC1_1 and DOC2_1 of the glass article 101 according to the current exemplary embodiment are smaller than the first and second compression depths DOC1 and DOC2 of the glass article 100 of FIGS. 3 and 7.

More specifically, the first maximum compressive stress CS1_1 at the first surface US of the glass article 101 (sample #3) according to the current exemplary embodiment may be greater than the first maximum compressive stress CS1' at the first surface US of sample #2, and the first compression depth DOC1_1 of the glass article 101 (sample #3) according to the current exemplary embodiment may be smaller than a first compression depth DOC1' of sample #2.

Maximum tensile stress CT1_1 of a tensile region CTR of sample #3 may be greater than maximum tensile stress CT1' of sample #2 in its absolute value.

The glass article 101 according to the current exemplary embodiment may further include impurities. The content of the impurities may be 0.02 wt % or more. The impurities may include copper ions, iron ions, or tin ions.

A method of manufacturing the glass article 101 according to the current exemplary embodiment will now be described.

Figure 15:
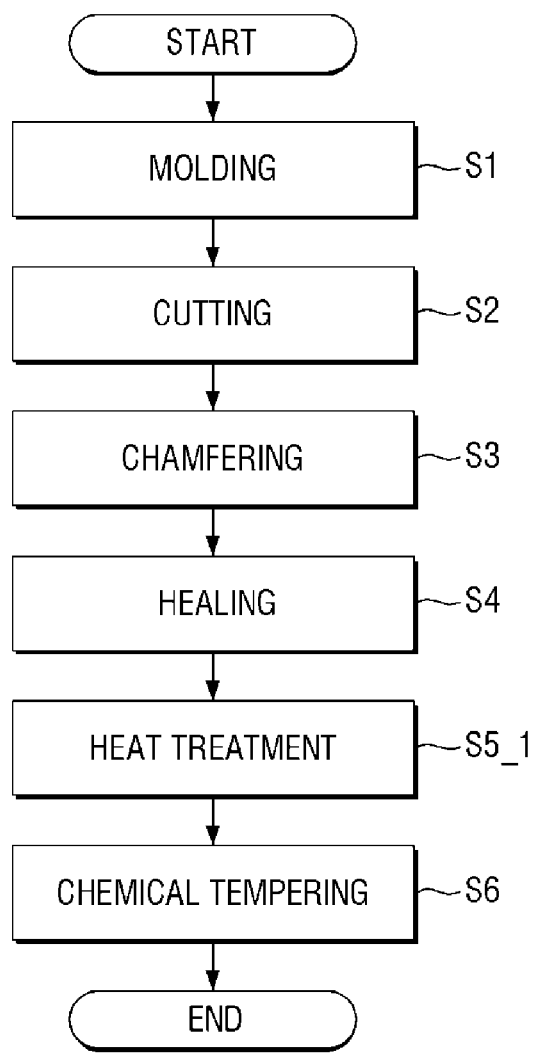
FIG. 15 is a flowchart illustrating operations in a method of manufacturing a glass article according to an exemplary embodiment.
Figure 16:
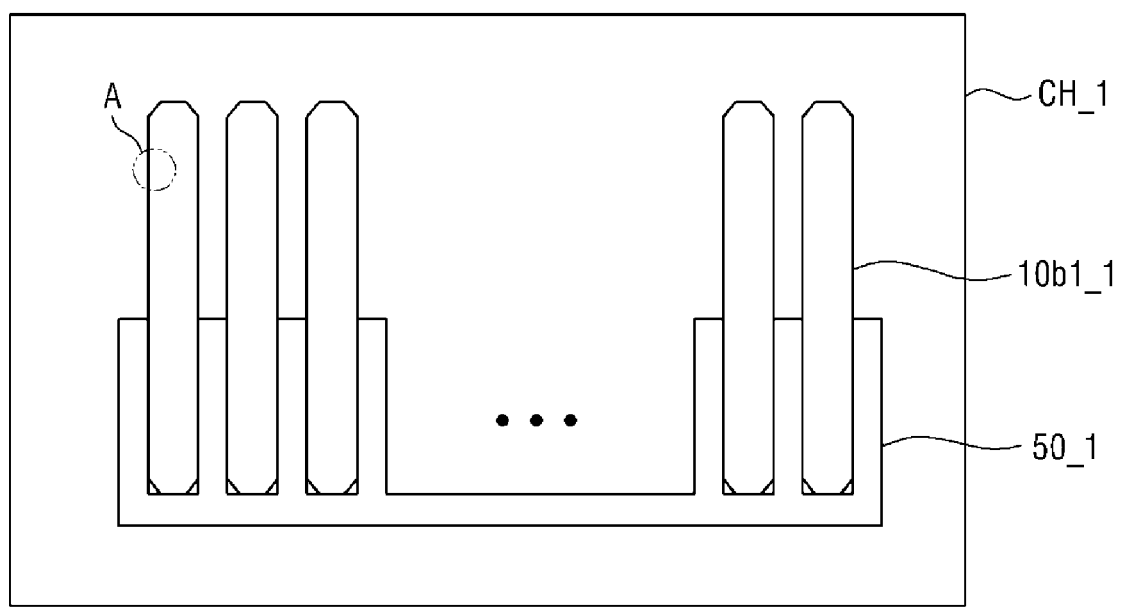
FIG. 16 illustrates a heat treatment operation according to the exemplary embodiment of FIG. 15 in detail.
Figure 17:
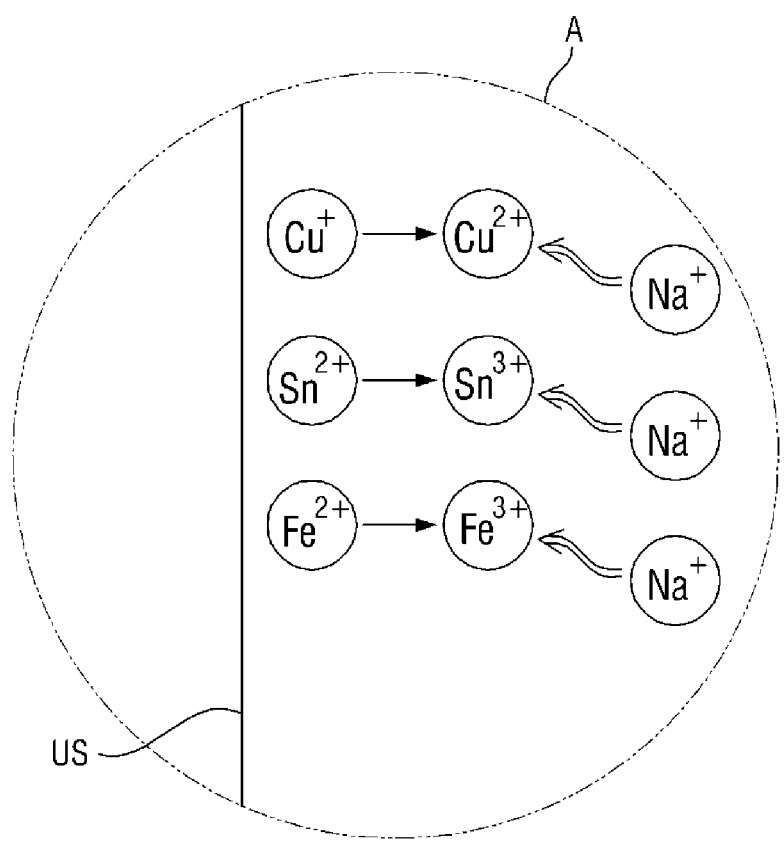
FIG. 17 is an enlarged view of region A of FIG. 16.
Figure 18:
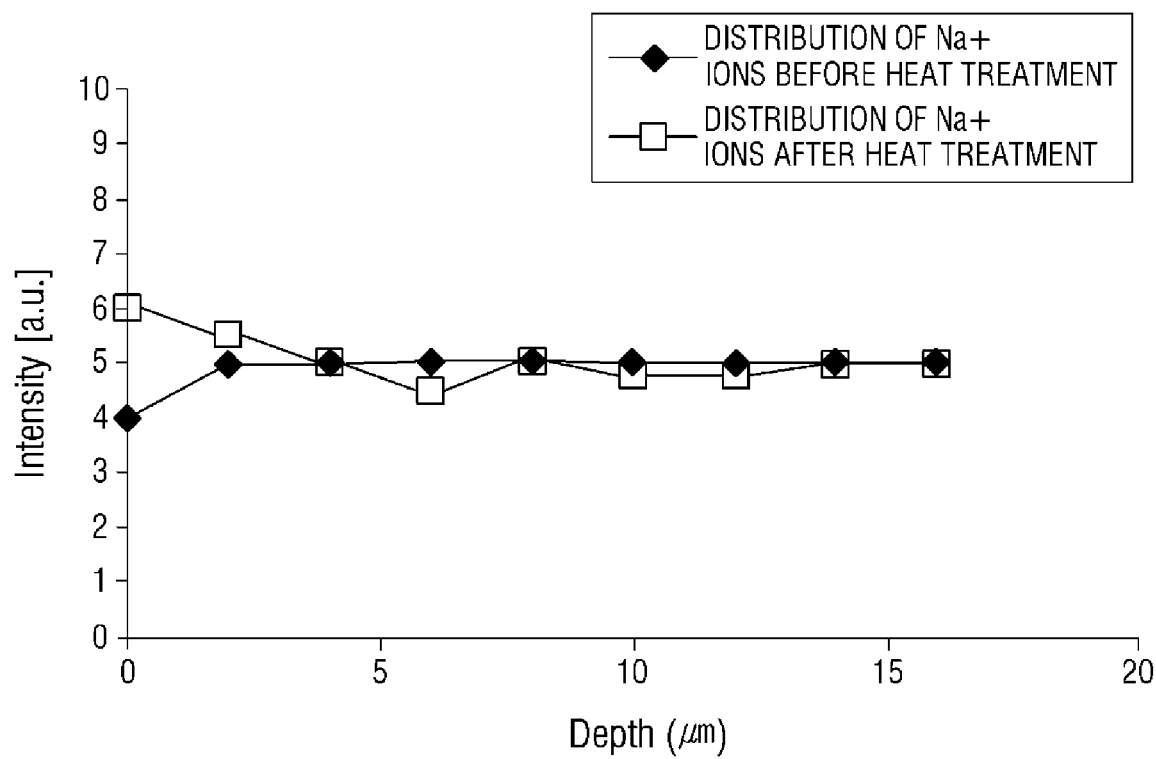
FIG. 18 is a graph illustrating the distribution of sodium ions before and after the heat treatment operation according to the exemplary embodiment of FIG. 15.
Figure 19:
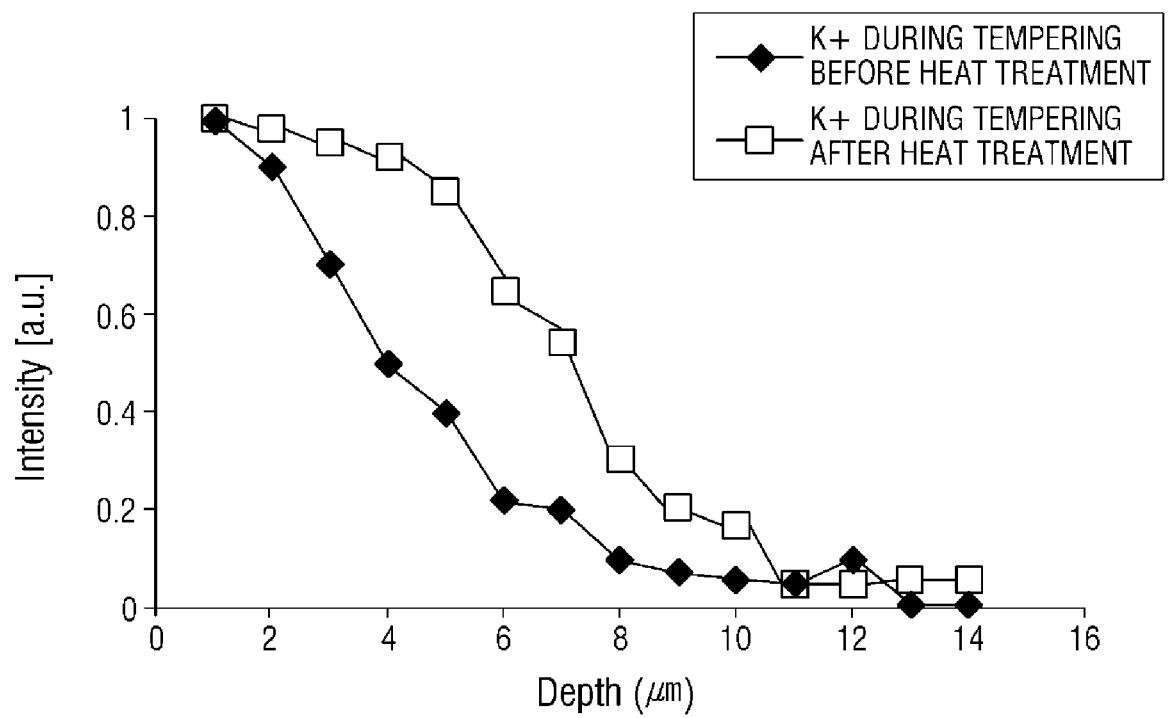
FIG. 19 is a graph illustrating the distribution of potassium ions during tempering before and after the heat treatment operation according to the exemplary embodiment of FIG. 15.

FIG. 15 is a flowchart illustrating operations in a method of manufacturing a glass article according to an exemplary embodiment. FIG. 16 illustrates a heat treatment operation according to the exemplary embodiment of FIG. 15 in detail. FIG. 17 is an enlarged view of region A of FIG. 16. FIG. 18 is a graph illustrating the distribution of sodium ions before and after the heat treatment operation according to the exemplary embodiment. FIG. 19 is a graph illustrating the distribution of potassium ions during tempering before and after the heat treatment operation according to the exemplary embodiment.

Referring to FIGS. 15 through 19, the method of manufacturing the glass article 101 according to the current exemplary embodiment is different from the method of manufacturing a glass article according to the exemplary embodiment of FIG. 8 in that heat treatment (operation S5_1) is performed instead of the high-temperature/high-humidity treatment (operation S5) of the exemplary embodiment of FIG. 8.

In operation S5_1, a plurality of sheets of glass 10b1_1 may be placed in grooves of a support device 50_1 inside a chamber CH_1. The sheets of glass 10b1_1 may be heat-treated (operation S5_1) for less than about 4 hours under a temperature condition of about 600 to 700 degrees Celsius above a strain point and below a softening point of glass in the chamber CH_1 in which an oxidizing atmosphere (containing oxygen molecules) has been created.

Impurities such as copper ions, iron ions or tin ions disposed in the surface of each sheet of glass 10b1_1 may be oxidized within the chamber CH_1 under the above temperature condition of the chamber CH_1. For the electron balance of the oxidized impurities, sodium ions may be moved to the first and second surfaces US and RS of each sheet of glass 10b1_1.

That is, the heat treatment of the sheets of glass 10b1_1 (operation S5_1) may result in the formation of sodium ion excess regions in the vicinity of the first and second surfaces US and RS of each sheet of glass 10b1_1, thereby further facilitating the ion exchange between potassium ions and sodium ions at the first and second surfaces US and RS of each sheet of glass 10b1 and forming the stress profile graphs of sample #3 and sample #2 as described above in FIG. 14.

In FIGS. 18 and 19, the x axis represents the thickness direction from the first surface US or the second surface RS of a sheet of glass 10b1_1, and they axis represents the distribution of sodium ions and the distribution of potassium ions.

Referring to FIG. 18, the distribution of sodium ions in the vicinity of the surface US or RS after the heat treatment (operation S5_1) may be greater than the distribution of sodium ions in the vicinity of the surface US or RS before the heat treatment (operation S5_1), and the distribution of potassium ions in the vicinity of the surface US or RS after the heat treatment (operation S5_1) may be greater than the distribution of sodium ions in the vicinity of the surface US or RS before the heat treatment (operation S5_1).

Furthermore, referring to FIG. 19, the distribution of potassium ions in the vicinity of the surface US or RS after the heat treatment (operation S5_1) and chemical tempering (operation S6) may be greater than the distribution of potassium ions in the vicinity of the surface US or RS after the chemical tempering (operation S6) performed without the heat treatment (operation S5_1).

Figure 20:
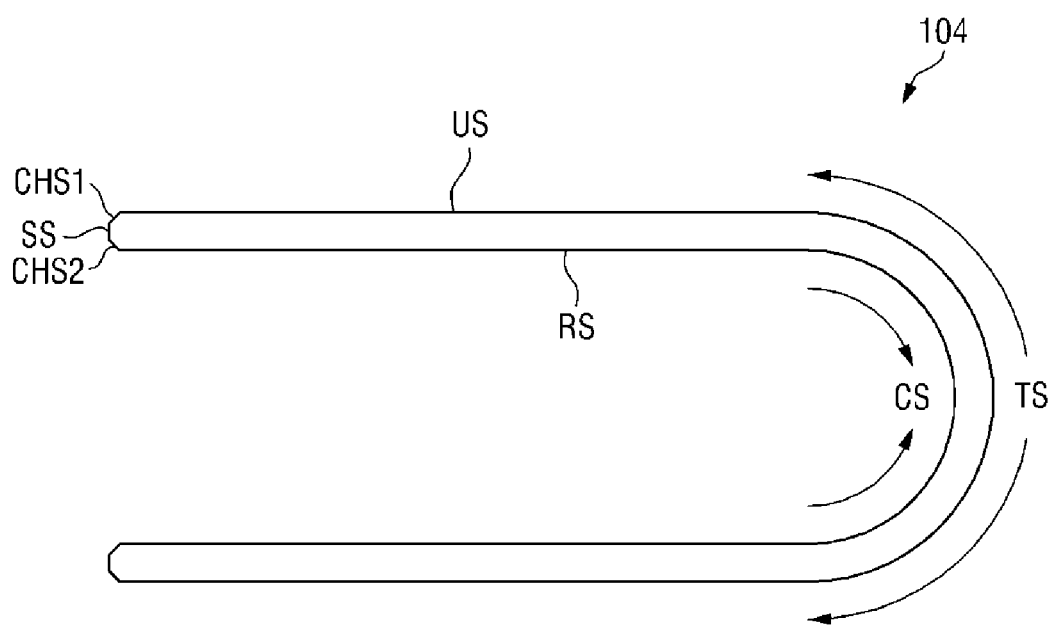
FIG. 20 is a cross-sectional view of a glass article according to an exemplary embodiment.
Figure 21:
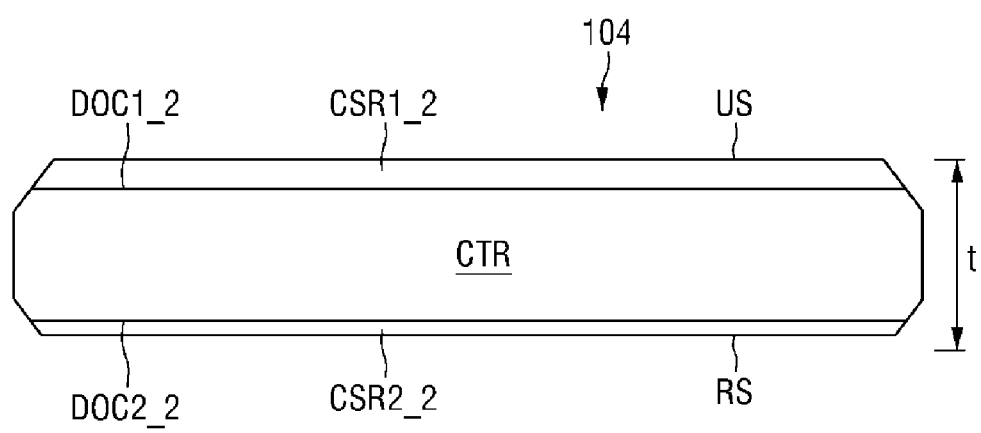
FIG. 21 is an enlarged cross-sectional view of FIG. 20.
Figure 22:
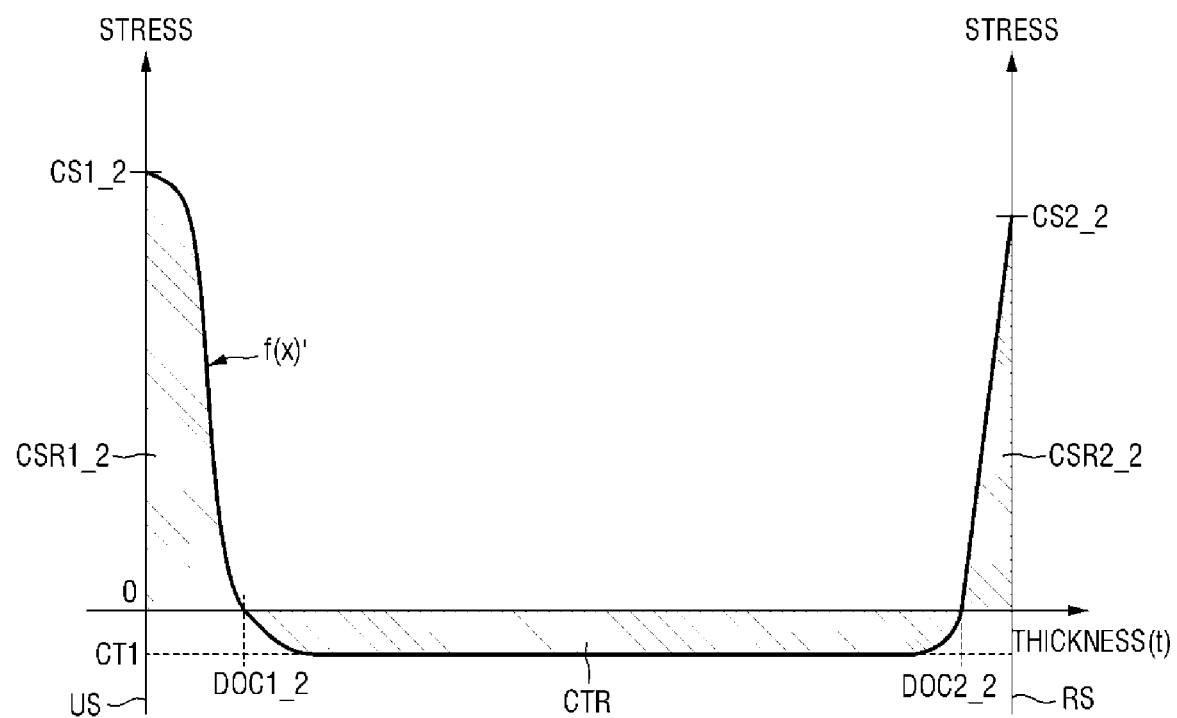
FIG. 22 is a graph illustrating a stress profile of the glass article according to the exemplary embodiment of FIG. 20.

FIG. 20 is a cross-sectional view of a glass article 104 according to an exemplary embodiment. FIG. 21 is an enlarged cross-sectional view of FIG. 20. FIG. 22 is a graph illustrating a stress profile of the glass article 104 according to the exemplary embodiment. Although the glass article 104 of FIG. 20 is illustrated as being flat in FIG. 21 for ease of description, the glass article 104 is actually folded as illustrated in FIG. 20.

Referring to FIGS. 20 through 22, the foldable glass article 104 is different from the flat plate-shaped glass article 100 in that a tensile force TS is formed on an outer circumferential surface (i.e., the first surface US), and a compressive force CS is further formed on an inner circumferential surface (i.e., the second surface RS). That is, even if sufficient compressive stress is formed on the outer circumferential surface US of the foldable glass article 104 by chemical tempering, the compressive stress may be offset by the tensile force TS generated by the folding of the glass article 104. On the other hand, compressive stress formed on the inner circumferential surface RS may be reinforced by the compressive force CS generated by the folding of the glass article 104. Therefore, cracks or grooves may be easily formed around the outer circumferential surface US on which the compressive stress is offset by the tensile force TS and may easily propagate to a tensile region CTR. Referring further to FIG. 2, the glass article 104 may be bonded to a display panel 200 by an optically-clear bonding layer 300. When the foldable glass article 104 is bonded to the display panel 200 by the optically-clear bonding layer 300, the display panel 200, the optically-clear bonding layer 300, and the foldable glass article 104 may be collectively referred to as a foldable display device.

In this case, the inner circumferential surface RS may be directly attached to the optically-clear bonding layer 300, and the outer circumferential surface US may be located outside the inner circumferential surface RS.

The foldable display device may be folded such that parts of the inner circumferential surface RS face each other as shown in FIG. 20. The tensile force TS may be applied to the outer circumferential surface US as described above.

A first compression depth DOC1_2 of a first compressive region CSR1_2 including the outer circumferential surface US may be greater than a second compression depth DOC2_2 of a second compressive region CSR2_2 including the inner circumferential surface RS. The first maximum compressive stress CS1_2 at the outer circumferential surface US of the first compressive region CSR1_2 may be greater than the second maximum compressive stress CS2_2 at the outer circumferential surface US of the second compressive region CSR2_2.

That is, referring to a stress profile function f(x)' of the glass article 104 according to the current exemplary embodiment of FIG. 22, a stress profile of the first compressive region CSR1_2 and a stress profile of the second compressive region CSR2_2 may be asymmetrical to each other. More specifically, the first compression depth DOC1_2 of the first compressive region CSR1_2 including the outer circumferential surface US may be greater than the second compression depth DOC2_2 of the second compressive region CSR2_2 including the inner circumferential surface RS. The first maximum compressive stress CS1_2 at the outer circumferential surface US of the first compressive region CSR1_2 may be greater than the second maximum compressive stress CS2_2 at the inner circumferential surface RS of the second compressive region CSR2_2.

Furthermore, the stress profile of the first compressive region CSR1_2 may be convex upward. On the other hand, the stress profile of the second compressive region CSR2_2 may be convex downward or may be substantially straight. A stress reduction in the thickness direction from the first surface (outer circumferential surface) US in the stress profile of the first compressive region CSR1_2 may be smaller than a stress reduction in the thickness direction from the second surface (inner circumferential surface) RS in the stress profile of the second compressive region CSR2_2. That is, since the first compressive region CSR1_2 has a smaller reduction in stress than the second compressive region CSR2_2 in the thickness direction from the surface of the glass article 104 and, as described above, has a greater compression depth and greater compressive stress at the surface, the first compressive region CSR1_2 may have a relatively greater compressive energy.

The stress profile of the first compressive region CSR1_2 and the stress profile of the second compressive region CSR2_2 may be generated through a method of manufacturing the glass article 104 which will be described later.

Figure 23:
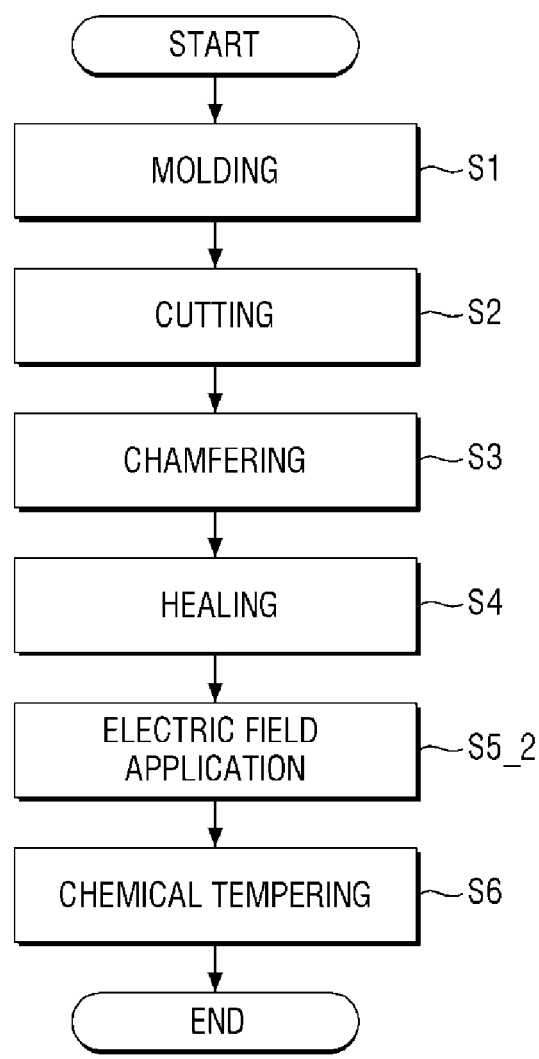
FIG. 23 is a flowchart illustrating operations in a method of manufacturing a glass article according to an exemplary embodiment.
Figure 24:
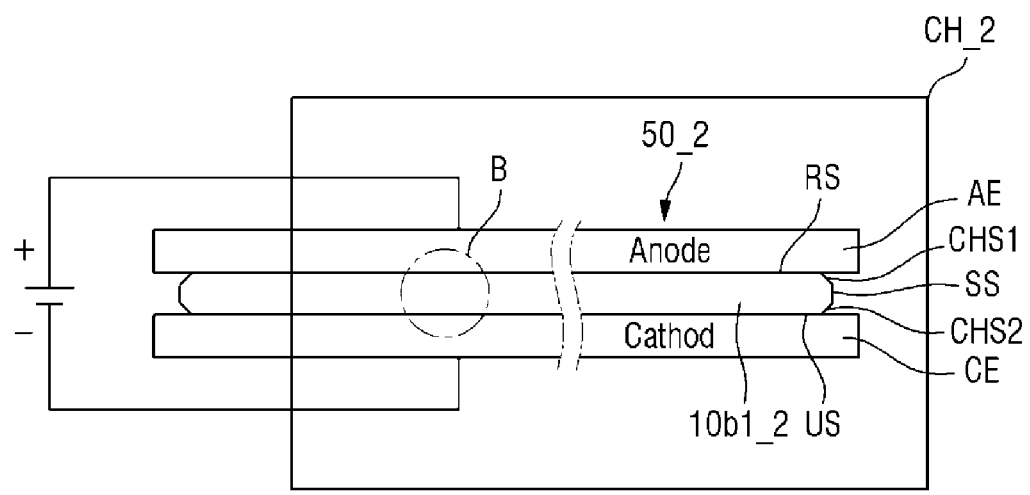
FIG. 24 illustrates, in detail, an electric field applying operation according to the exemplary embodiment of FIG. 23 performed using an electric field applying device according to an exemplary embodiment.
Figure 25:
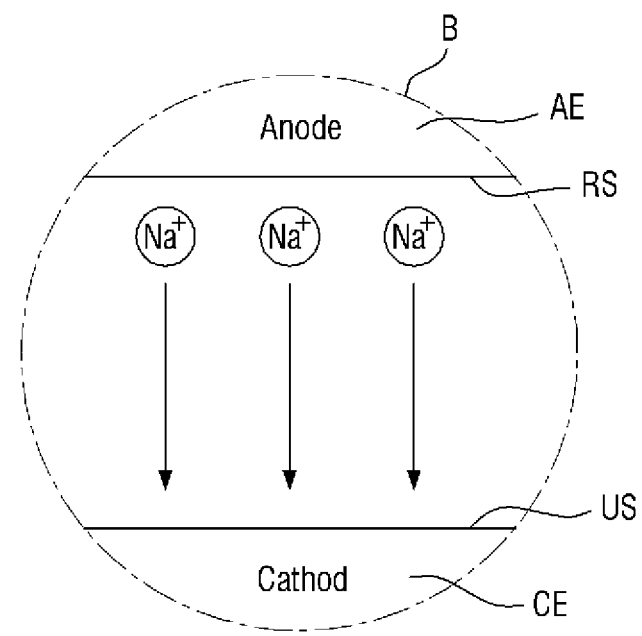
FIG. 25 is an enlarged view of region B of FIG. 24.

FIG. 23 is a flowchart illustrating operations in a method of manufacturing a glass article according to an exemplary embodiment. FIG. 24 illustrates an electric field applying operation according to the exemplary embodiment of FIG. 23 in detail. FIG. 25 is an enlarged view of region B of FIG. 24.

Referring to FIGS. 23 through 25, the method of manufacturing the glass article 104 according to the current exemplary embodiment is different from the method of manufacturing the glass article 100 according to the exemplary embodiment of FIG. 8 in that an electric field applying operation (operation S5_2) is performed instead of the high-temperature/high-humidity treatment operation (operation S5).

More specifically, an electric field may be applied to a sheet of glass (operation S5_2) after the sheet of glass is healed (operation S4). Then, chemical tempering may be performed (operation S6).

The applying of the electric field (operation S5_2) may be performed using an electric field applying device 50_2 including a positive plate electrode AE (or anode) to which a positive voltage in a chamber CH_2 is applied and a negative plate electrode CE (or cathode) to which a negative voltage is applied. Each sheet of glass 10b1_2 is placed between the positive plate electrode AE and the negative plate electrode CE. Here, a negative voltage may be applied to the first surface US (i.e., outer circumferential surface) of a sheet of glass 10b1_2, and a positive voltage may be applied to the second surface RS (i.e., inner circumferential surface).

Each of the plate electrodes CE and AE may include a conductive material whose surface is flat. The conductive material may be, for example, a metal, a transparent oxide conductive material such as ITO, or a conductive polymer, for example.

The chamber CH_2 may maintain a constant temperature during the applying of the electric field. In another exemplary embodiment, the chamber CH_2 may freely adjust an electric field application temperature range. For example, the chamber CH_2 may adjust its internal temperature within the range of about 0 to about 400 degrees Celsius during the applying of the electric field. As the internal temperature increases during the applying of the electric field, the moving speed of sodium ions (i.e., alkali ions) may increase.

The magnitude of the electric field applied to the sheet of glass 10b1_2 may range from 100 volts per centimeter (V/cm) to 200 V/cm.

In some exemplary embodiments, the electric field may be applied to the sheet of glass 10b1_2 in a silicon oil bath instead of the chamber CH_2. In this case, the electric field may be applied to the sheet of glass 10b1_2 in a state where all of the surfaces and side surfaces of the sheet of glass 10b1_2 are immersed in the silicon oil bath.

Sodium ions adjacent to the positive voltage substrate (i.e., the positive plate electrode AE) may behave differently from sodium ions adjacent to the negative voltage substrate (i.e., the negative plate electrode CE). Since the sodium ions adjacent to the positive voltage substrate (plate electrode) AE have the same polarity as an anode, the sodium ions may move toward the negative voltage substrate (plate electrode)

CE. However, since the sodium ions adjacent to the negative voltage substrate (plate electrode) CE have a different polarity from a cathode, the sodium ions adjacent to the negative voltage substrate CE may remain adjacent to the negative voltage substrate (plate electrode) CE. Therefore, the distribution (amount) of sodium ions moving toward the negative voltage substrate (plate electrode) CE may increase, thereby forming a sodium excess region in the first surface US (outer circumferential surface) of the sheet of glass 10$b$1_2.

That is, the applying of the electric field to the sheet of glass 10$b$1_2 (operation S5_2) may result in the formation of a sodium ion excess region in the vicinity of the first surface US (outer circumferential surface) of the sheet of glass 10$b$1_2, thereby further facilitating the ion exchange between potassium ions and sodium ions at the first surface US (outer circumferential surface) of the sheet of glass 10$b$1_2 and forming the stress profile as described above in FIG. 22.

Figure 26:
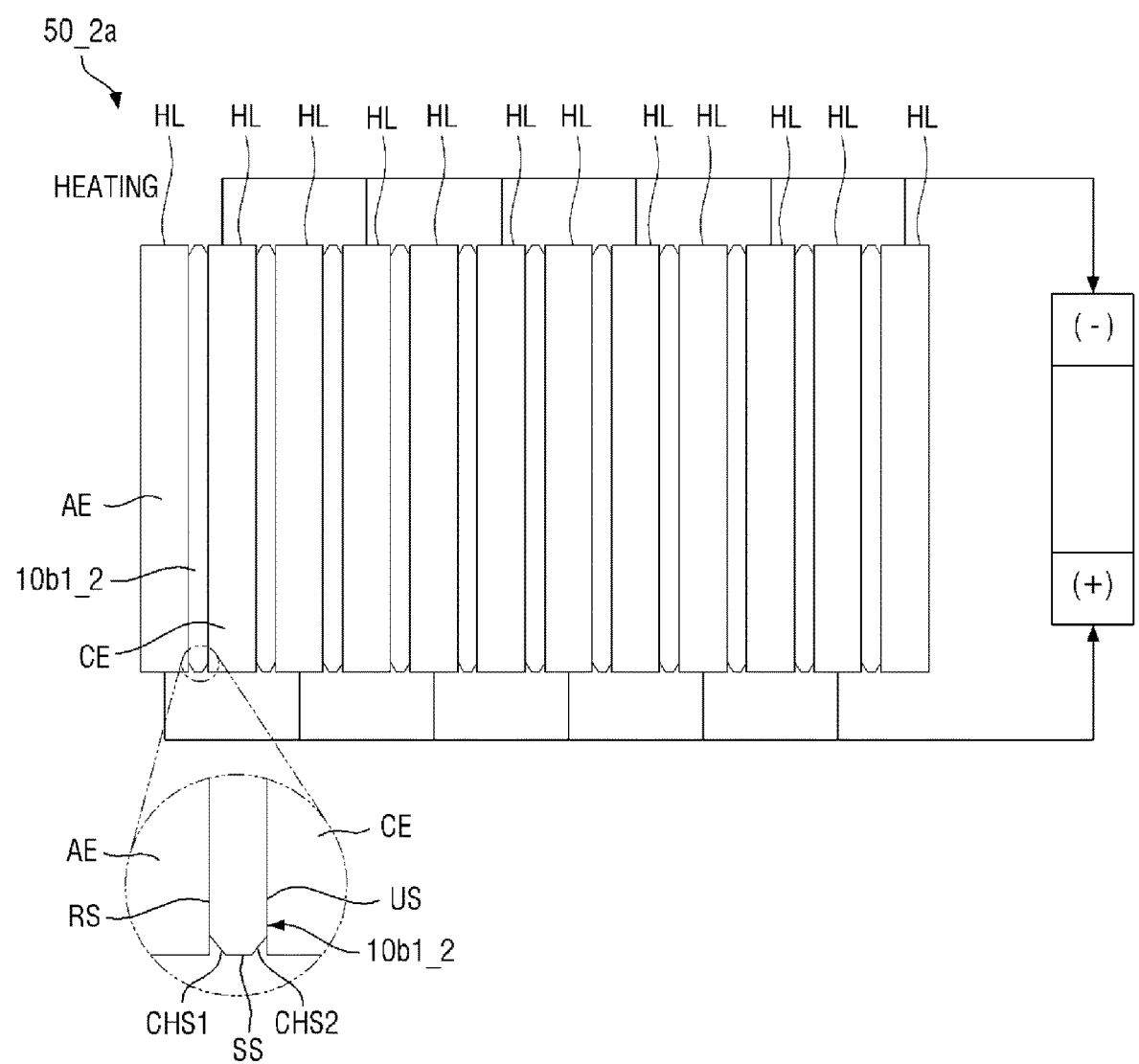
FIG. 26 illustrates, in detail, the electric field applying operation according to the exemplary embodiment of FIG. 23 performed using an electric field applying device according to an exemplary embodiment.
Figure 27:
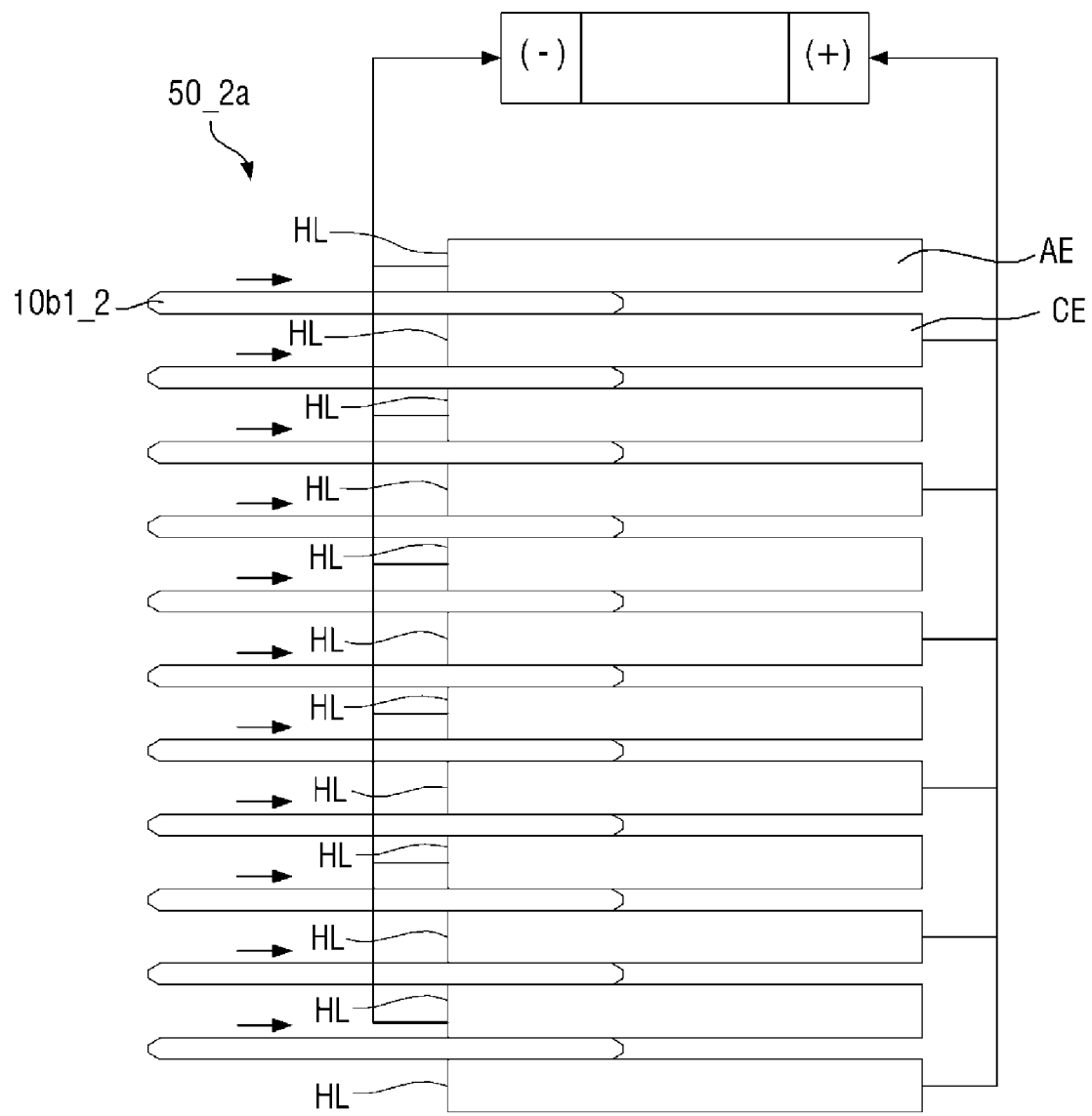
FIG. 27 illustrates a glass placing operation in the electric field applying operation according to the exemplary embodiment of FIG. 23 performed using the electric field applying device according to an exemplary embodiment.
Figure 28:
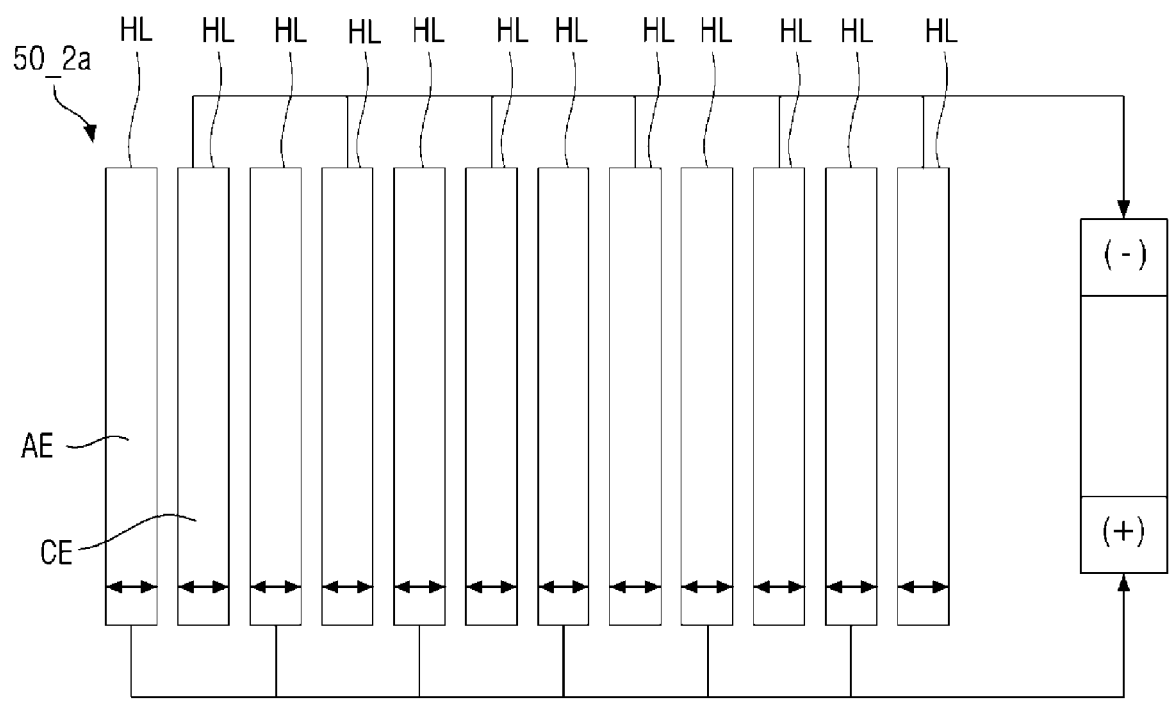
FIG. 28 illustrates the movement of the electric field applying device according to an exemplary embodiment.

FIG. 26 illustrates, in detail, the electric field applying operation according to an exemplary embodiment performed using an electric field applying device 50_2$a$ according to an exemplary embodiment. FIG. 27 illustrates a glass placing operation in the electric field applying operation according to an exemplary embodiment performed using the electric field applying device 50_2$a$ according to the exemplary embodiment. FIG. 28 illustrates the movement of the electric field applying device 50_2$a$ according to the exemplary embodiment.

Referring to FIGS. 26 through 28, the electric field applying operation according to the exemplary embodiment is different from the electric field applying operation of FIGS. 23 and 24 in that the electric field applying operation according to the exemplary embodiment is performed by the electric field applying device 50_2$a$ according to an exemplary embodiment.

The electric field applying operation according to the current exemplary embodiment may further include placing a plurality of sheets of glass 10$b$1_2 between a plurality of negative plate electrodes CE and a plurality of positive plate electrodes AE. The negative plate electrodes CE and the positive plate electrodes AE may be alternately arranged. For example, the negative plate electrodes CE and the positive plate electrodes AE may be alternately arranged along a horizontal direction as illustrated in FIG. 26. In the placing of the sheets of glass 10$b$1_2, the sheets of glass 10$b$1_2 may respectively be placed between the negative plate electrodes CE and the positive plate electrodes AE arranged alternatively.

Referring to FIG. 27, the negative plate electrodes CE and the positive plate electrodes AE may be rotatable. For example, each of the negative plate electrodes CE and the positive plate electrodes AE of the electric field applying device 50_2$a$ may be rotated to extend along the horizontal direction during the glass placing operation and to extend along a vertical direction when an electric field is applied after the glass placing operation. Therefore, it is possible to prevent the sheets of glass 10$b$1_2 from warping in the thickness direction when the electric field is applied in a state where the sheets of glass 10$b$1_2 is inserted to the negative plate electrodes CE and the positive plate electrodes AE extended along the horizontal direction.

Referring to FIG. 28, each of the negative plate electrodes CE and the positive plate electrodes AE can be moved along the horizontal direction or the vertical direction. Therefore, the sheets of glass 10$b$1_2 can be more easily placed between the negative plate electrodes CE and the positive plate electrodes AE.

Each of the negative voltage and the positive voltage may include a direct current ("DC") waveform, an alternating current ("AC") waveform, a pulsed DC waveform, or a periodic AC (radio frequency ("RF")) waveform.

The electric field applying device 50_2$a$ according to the exemplary embodiment may further include heat supply lines HL respectively connected to the negative plate electrodes CE and the positive plate electrodes AE to supply heat. The heat supply lines HL may be used to apply an electric field and supply heat at the same time. The heat supply lines HL may be connected or inserted into the surfaces or inside of the negative plate electrodes CE and the positive plate electrodes AE, respectively. After the electric field is applied through the heat supply lines HL, a tempering rate may be increased during surface tempering, and heat annealing may be performed.

Figure 29:
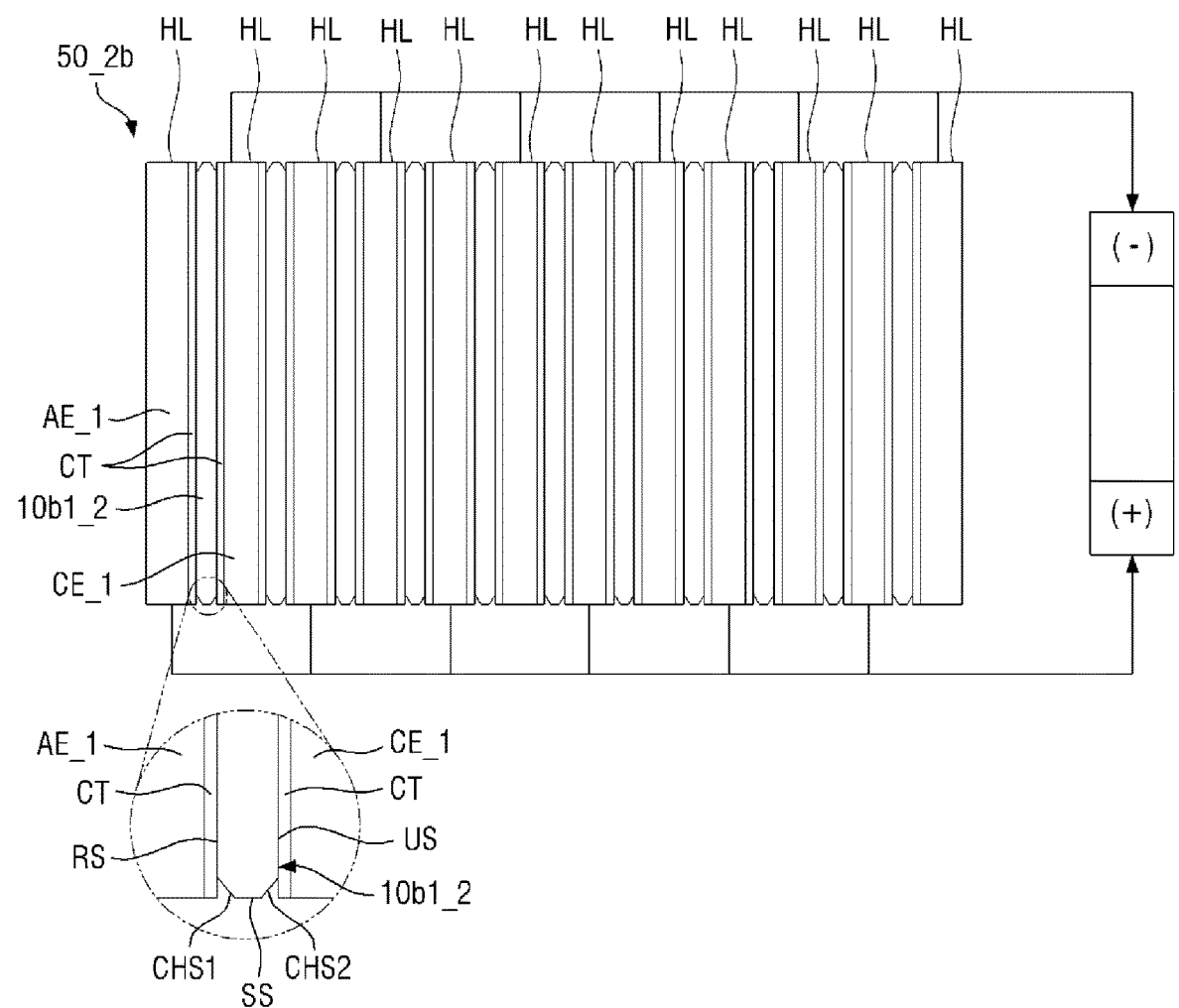
FIG. 29 illustrates, in detail, the electric field applying operation according to the exemplary embodiment of FIG. 23 performed using an electric field applying device according to an exemplary embodiment.

FIG. 29 illustrates, in detail, the electric field applying operation according to the exemplary embodiment performed using an electric field applying device 50_2$b$.

Referring to FIG. 29, the electric field applying device 50_2$b$ according to the exemplary embodiment is different from the electric field applying device 50_2$a$ in that the electric field applying device 50_2$b$ further includes a coating layer CT disposed on a surface of each negative plate electrode CE_1 which faces an adjacent positive plate electrode AE_1 and a surface of each positive plate electrode AE_1 which faces an adjacent negative plate electrode CE_1.

The coating layer CT may include an electrode material.

Figure 30:
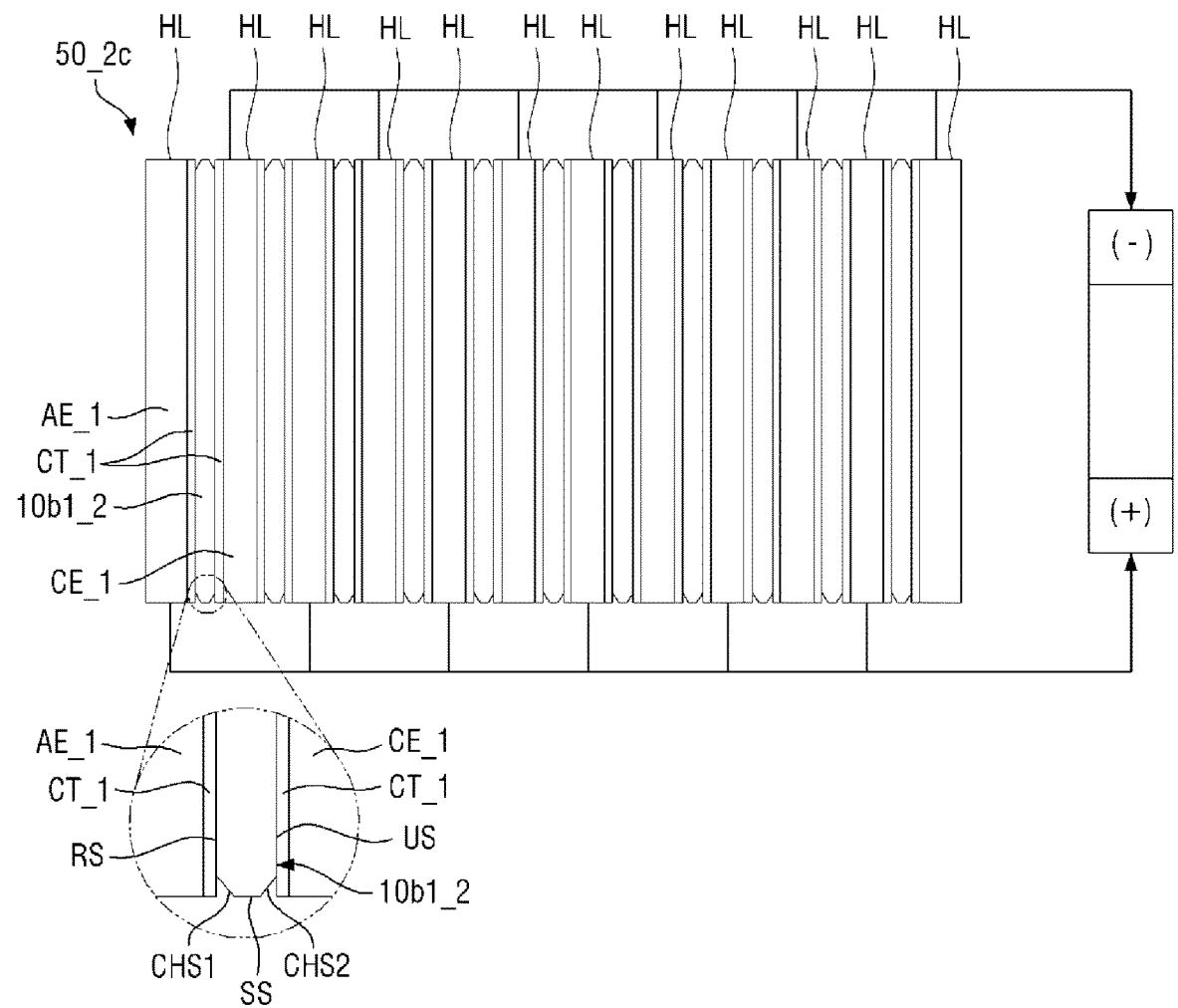
FIG. 30 illustrates, in detail, the electric field applying operation according to the exemplary embodiment of FIG. 23 performed using an electric field applying device according to an exemplary embodiment.

FIG. 30 illustrates, in detail, the electric field applying operation according to an exemplary embodiment performed using an electric field applying device 50_2$c$.

Referring to FIG. 30, the electric field applying device 50_2$c$ according to the exemplary embodiment is different from the electric field applying device 50_2$b$ of FIG. 29 in that a coating layer CT_1 includes an electrode protective layer.

More specifically, the coating layer CT_1 of the electric field applying device 50_2$c$ according to the exemplary embodiment may include an electrode protective layer. The electrode protective layer may include, but is not limited to, a dielectric.

Figure 31:
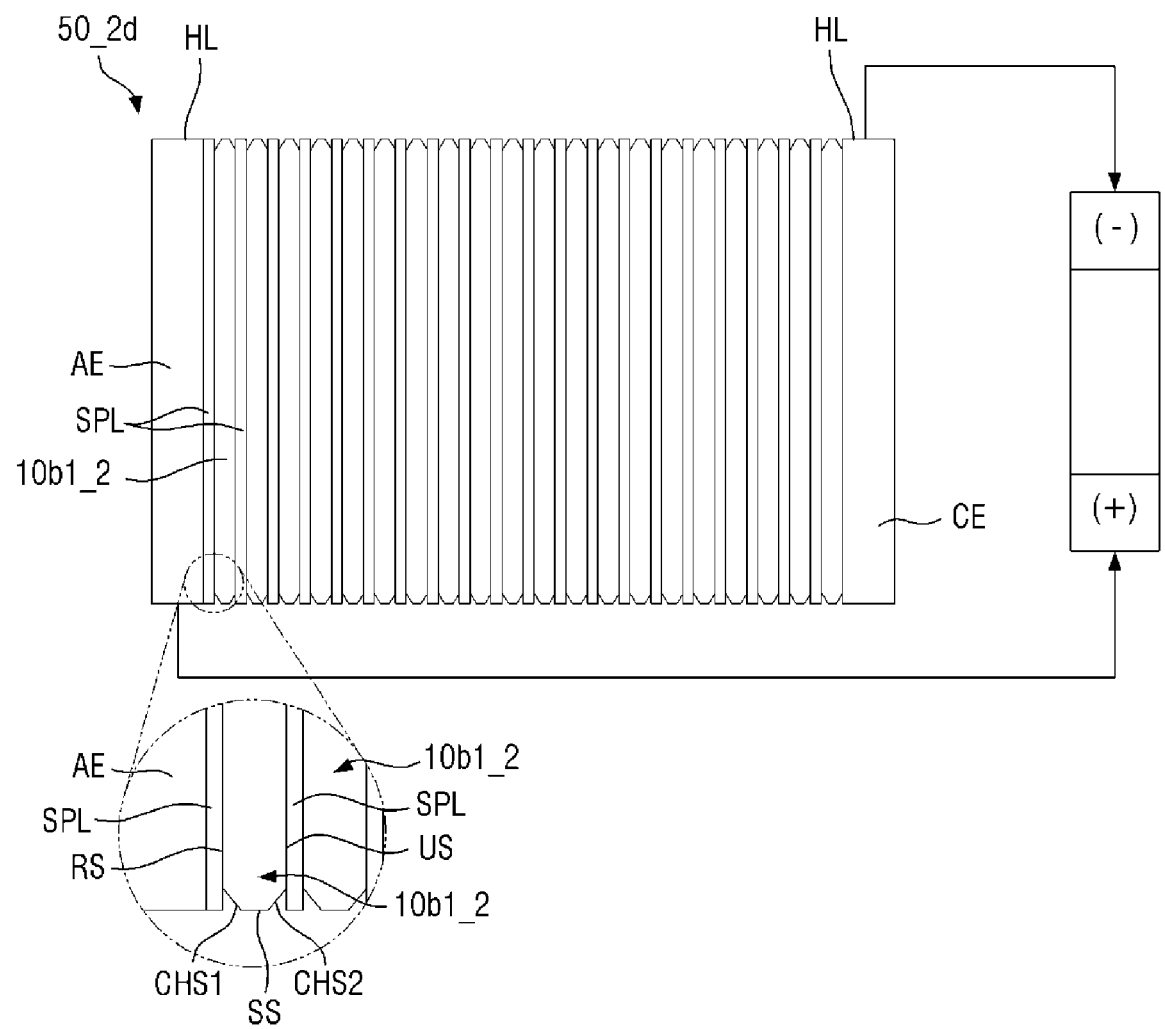
FIG. 31 illustrates, in detail, the electric field applying operation according to the exemplary embodiment of FIG. 23 performed using an electric field applying device according to an exemplary embodiment.

FIG. 31 illustrates, in detail, the electric field applying operation according to an exemplary embodiment performed using an electric field applying device 50_2$d$.

Referring to FIG. 31, the electric field applying device 50_2$d$ and a glass placing operation according to the exemplary embodiment are different from the electric field applying device 50_2$a$ and the glass placing operation described above in FIG. 26 in that one negative plate electrode CE and one positive plate electrode AE are provided and that a plurality of sheets of glass 10$b$1_2 are arranged parallel to each other between the negative plate electrode CE and the positive plate electrode AE in the glass placing operation.

More specifically, the electric field applying device 50_2$d$ according to the exemplary embodiment may include one negative plate electrode CE and one positive plate electrode AE. A plurality of sheets of glass 10$b$1_2 may be arranged parallel to each other between the negative plate electrode CE and the positive plate electrode AE.

The electric field applying device 50_2$d$ according to the current exemplary embodiment may further include glass protective layers SPL disposed between the negative plate electrode CE and the positive plate electrode AE. Each of the glass protective layers SPL may be disposed between adjacent sheets of glass 10$b$1_2. Each of the glass protective layers SPL may prevent adjacent sheets of glass 10$b$1_2 from physically damaging, for example, scratching each other. The glass protective layers SPL may include films or resins.

A glass article and a display device according to an exemplary embodiment may have good compressive stress while having a small thickness.

According to a method of manufacturing a glass article according to an exemplary embodiment, it is possible to manufacture a glass article having good compressive stress while having a small thickness.

According to an electric field applying device according to an exemplary embodiment, it is possible to manufacture a glass article having good compressive stress while having a small thickness.

Although exemplary embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A glass article comprising:
a first surface;
a second surface which is opposite the first surface;
a first compressive region which extends to a first compression depth in a thickness direction of the glass article from the first surface;
a second compressive region which extends to a second compression depth in the thickness direction from the second surface; and
a tensile region which is disposed between the first compressive region and the second compressive region,
wherein a stress profile of the first compressive region comprises a first point and a first inflection point, the first inflection point is located between the first point and the first surface, a depth from the first surface to the first point is about 45 to about 55 percentages (%) of the first compression depth from the first surface, stress at the first point is greater than about 50% of compressive stress at the first surface,
wherein a second point in the first compressive region has 90% of a maximum distribution of potassium ions at a single significant figure, and
a third point, of which a depth from the first surface in the thickness direction is twice as a depth of the second point from the first surface in the thickness direction, has a value equal to 30% of the maximum distribution of potassium ions.

2. The glass article of claim 1, wherein the stress profile of the first compressive region is convex upward when the stress profile is illustrated as a graph of which x axis represents the thickness direction and y axis represents a stress value.

3. The glass article of claim 2, wherein a thickness of the glass article is about 0.01 to about 0.05 millimeters (mm), the first compression depth ranges from about 8 micrometers (μm) to about 12 μm, and the compressive stress at the first surface ranges from about 800 megapascals (MPa) to about 1100 MPa.

4. The glass article of claim 3, wherein stress at the first inflection point is 60% or more of the compressive stress at the first surface.

5. The glass article of claim 4, further comprising:
a first side surface located between the first surface and the second surface;
a first chamfer surface located between the first side surface and the first surface; and
a second chamfer surface located between the first side surface and the second surface.

6. The glass article of claim 4, wherein the stress profile of the first compressive region is symmetrical to a stress profile of the second compressive region.

7. The glass article of claim 6, further comprising hydrogen ions and hydronium ions.

8. The glass article of claim 6, further comprising impurities, wherein a content of the impurities is about 0.02 percentages by weight (wt %) or more, and the impurities comprise copper ions, iron ions, or tin ions.

9. The glass article of claim 4, wherein the first compression depth of the first compressive region is greater than the second compression depth of the second compressive region, and a magnitude of the compressive stress at the first surface is greater than a magnitude of compressive stress at the second surface.

10. A glass article comprising:
a first surface;
a second surface which is opposite the first surface;
a first compressive region which extends to a first compression depth in a thickness direction of the glass article from the first surface;
a second compressive region which extends to a second compression depth in the thickness direction from the second surface; and
a tensile region which is disposed between the first compressive region and the second compressive region,
wherein a stress profile of the first compressive region comprises a first point and a first inflection point, the first inflection point is located between the first point and the first surface, a depth from the first surface to the first point is about 45 to about 55 percentages (%) of the first compression depth from the first surface, stress at the first point is greater than about 50% of compressive stress of the first surface, the first compression depth of the first compressive region is greater than the second compression depth of the second compressive region, and a magnitude of the compressive stress at the first surface is greater than a magnitude of compressive stress at the second surface,
wherein a second point in the first compressive region has 90% of a maximum distribution of potassium ions at a single significant figure, and
a third point, of which a depth from the first surface in the thickness direction is twice as a depth of the second point from the first surface in the thickness direction, has a value equal to 30% of the maximum distribution of potassium ions.

11. The glass article of claim 10, wherein the glass article is formed sequentially through an electric field applying operation in which a negative voltage is applied to the first surface and a positive voltage is applied to the second surface, and a chemical tempering operation.

12. A display device comprising:
a display panel which comprises a plurality of pixels;
a cover window which is disposed on the display panel; and
an optically-clear bonding layer which is disposed between the display panel and the cover window,
wherein the cover window comprises:
a first surface;
a second surface which is opposite the first surface;
a first compressive region which extends to a first compression depth in a thickness direction of the glass article from the first surface;

a second compressive region which extends to a second compression depth in the thickness direction from the second surface; and a tensile region which is disposed between the first compressive region and the second compressive region, wherein a stress profile of the first compressive region comprises a first point and a first inflection point, the first inflection point is located between the first point and the first surface, a depth from the first surface to the first point is about 45 to about 55 percentages (%) of the first compression depth from the first surface, stress at the first point is greater than about 50% of compressive stress at the first surface, wherein a second point in the first compressive region has 90% of a maximum distribution of potassium ions at a single significant figure, and a third point, of which a depth from the first surface in the thickness direction is twice as a depth of the second point from the first surface in the thickness direction, has a value equal to 30% of the maximum distribution of potassium ions.

13. The display device of claim 12, wherein a thickness of the cover window is about 0.01 to about 0.05 millimeters (mm), the stress profile of the first compressive region is convex upward when the stress profile is illustrated as a graph of which x axis represents the thickness direction and y axis represents a stress value, the first compression depth ranges from about 8 micrometers ($\mu$m) to about 12 $\mu$m, the compressive stress at the first surface ranges from about 800 megapascals (MPa) to about 1100 MPa, and stress at the first inflection point is about 60% or more of the compressive stress at the first surface.

14. The display device of claim 13, wherein the first compression depth of the first compressive region is greater than that the second compression depth of the second compressive region, and a magnitude of the compressive stress at the first surface is greater than a magnitude of compressive stress at the second surface.

* * * * *